United States Patent [19]

Gilham

[11] Patent Number: 5,622,178
[45] Date of Patent: Apr. 22, 1997

[54] SYSTEM AND METHOD FOR DYNAMICALLY DISPLAYING CARDIAC INTERVAL DATA USING SCATTER-PLOTS

[75] Inventor: Jeffrey J. Gilham, Seattle, Wash.

[73] Assignee: SpaceLabs Medical, Inc., Redmond, Wash.

[21] Appl. No.: 237,669

[22] Filed: May 4, 1994

[51] Int. Cl.$^6$ .......................... A61B 5/0402; A61B 5/044; A61B 5/0452; A61B 5/0456
[52] U.S. Cl. ...................... 128/696; 128/712; 128/695 R; 128/703; 128/708; 128/710
[58] Field of Search .................................... 128/630, 703, 128/708, 710, 712, 695, 696

[56] References Cited

U.S. PATENT DOCUMENTS

| | | | |
|---|---|---|---|
| 4,499,904 | 2/1985 | Sidorenko et al. | 128/703 |
| 4,732,157 | 3/1988 | Kaplan et al. | 128/703 |
| 4,934,374 | 6/1990 | Ostlund et al. | 128/710 |
| 4,964,410 | 10/1990 | Leahey et al. | 128/710 |
| 5,012,815 | 5/1991 | Bennett, Jr. et al. | 128/710 |
| 5,146,926 | 9/1992 | Cohen | 128/710 |
| 5,224,486 | 7/1993 | Lerman et al. | 128/710 |
| 5,285,793 | 2/1994 | Slovut et al. | 128/706 |

FOREIGN PATENT DOCUMENTS

| | | | |
|---|---|---|---|
| 0565084 | 10/1993 | European Pat. Off. | A61B 5/0452 |
| 1304801 | 12/1985 | U.S.S.R. | 128/696 |
| 1304801 | 4/1987 | U.S.S.R. | 128/696 |

OTHER PUBLICATIONS

Abstract of: article by Woo et al., "Heart rate variability in congenital central hypoventilation syndrome," *Pediatr. Res.* 31(3):291–6, 1992.
Woo et al., "Patterns of beat–to–beat heart rate variability in advanced heart failure," *Am. Heart J.* 123(3):704–10, 1992.
Literature from Corazonix Corporation regarding Predictor® Version 3.0 software product.
Literature from Oxford Medical Ltd. regarding Medilog® EXCEL Holter Management System.
Abstract of Poster Board by Nagumo et al., "Application of the Lorenz Plot to Analysis of Ventricular Arrhythmias." Applicants believe this was presented at an American Heart Association meeting in 1992.
Abstract of Poster Board by Toyoshima et al., "Application of the Lorenz Plot to Analysis of Atrial Fibrillation." Applicants believe this was presented at an American Heart Association meeting in 1992.
Abstract of Poster Board by Kim et al., "Application of the Lorenz Plot to Analysis of Autonomic Cardiovascular Functions." Applicants believe this was presented at a American Heart Association meeting in 1992.
Anan et al., "Arrhythmia Analysis by Successive RR Plotting," *Journal of Electrocardiology*, vol. 23, pp. 243–248, 1990.

*Primary Examiner*—William E. Kamm
*Assistant Examiner*—Carl H. Layno
*Attorney, Agent, or Firm*—Seed and Berry LLP

[57] ABSTRACT

A system and method for the dynamic display of scatter-plot data uses a color monitor or gray-scale monitor to indicate the relative frequency of occurrences of interval pairs corresponding to the scatter-plot data. A variety of user selectable analysis and display parameters are available to select the type of data desired for the scatter-plot display. The user selectable parameters include time parameters that allow the user to review all scatter-plot data collected over a first period of time in smaller increments of time. The system can display different time increments in different colors or intensities. The system also permits the selection of a particular interval pair and display the raw data corresponding to the selected interval pair. If there is more than one occurrence of the selected interval pair, the system permits the user to select from the plurality of occurrences and displays the raw data associated with the selected occurrence. If the system uses cardiac data, the user can specify analysis parameters that include the selection of beat source for each interval in the interval pair, clinical labels corresponding to cardiac rhythms, and pacemaker or intrinsically generated heartbeats. The interval pair may be derived from three successive heartbeats. The system can scan through a data file collected over a period of time. The display can show new interval pairs in one color or intensity and older interval pairs in other colors or intensities to provide a fading action in the display.

77 Claims, 22 Drawing Sheets

REGION SUMMARY:

| | |
|---|---|
| INCLUDED REGION START | 1-11:20 |
| INCLUDED REGION END | 2-11:31 |
| TOTAL INCLUDED TIME: | 24:11 |
| TOTAL INTERVAL PAIRS | 20571 |

LEGEND: DENSITY

```
        = 0
0 <     < 2
2 <=    < 4
4 <=    < 7
7 <=    < 12
12 <=   < 20
20 <=   < 33
33 <=   < 54
54 <=   < 75
75 <=   < 100
100 <=  < 200
200 <=  < 300
300 <=  < 400
        >= 400
```

LORENTZ SCATTER PLOT CONFIGURATION

| | INTERVAL 1 | INTERVAL 2 |
|---|---|---|
| SUPRAVENTRICULAR – SUPRAVENTRICULAR | ☒ | ☒ |
| SUPRAVENTRICULAR – VENTRICULAR | ☒ | ☒ |
| VENTRICULAR – SUPRAVENTRICULAR | ☒ | ☒ |
| VENTRICULAR – VENTRICULAR | ☒ | ☒ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☒ | ☒ |
| NON-PAUSE – NON-PAUSE | ☒ | ☒ |
| PACED – PACED | ☒ | ☒ |
| PACED – INTRINSIC | ☐ | ☐ |
| INTRINSIC – PACED | ☐ | ☐ |
| INTRINSIC – INTRINSIC | ☐ | ☐ |
| MINIMUM INTERVAL THRESHOLD (msec.) | 200 | |
| MAXIMUM INTERVAL THRESHOLD (msec.) | 1200 | |

*Fig. 8B*

REGION SUMMARY:

INCLUDED REGION START　　1-18:40
INCLUDED REGION END　　　2-18:12
TOTAL INCLUDED TIME:　　　23:32
TOTAL INTERVAL PAIRS　　　100951

LEGEND:　　DENSITY

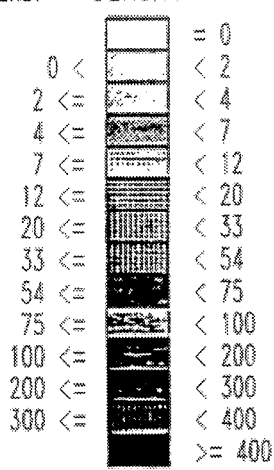

```
          = 0
  0 <      < 2
  2 <=     < 4
  4 <=     < 7
  7 <=     < 12
 12 <=     < 20
 20 <=     < 33
 33 <=     < 54
 54 <=     < 75
 75 <=     < 100
100 <=     < 200
200 <=     < 300
300 <=     < 400
           >= 400
```

LORENTZ SCATTER PLOT CONFIGURATION

|  | INTERVAL 1 | INTERVAL 2 |
|---|---|---|
| SUPRAVENTRICULAR – SUPRAVENTRICULAR | ☒ | ☒ |
| SUPRAVENTRICULAR – VENTRICULAR | ☒ | ☒ |
| VENTRICULAR – SUPRAVENTRICULAR | ☒ | ☒ |
| VENTRICULAR – VENTRICULAR | ☒ | ☒ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☒ | ☒ |
| NON-PAUSE – NON-PAUSE | ☒ | ☒ |

MINIMUM INTERVAL THRESHOLD (msec.)　　200
MAXIMUM INTERVAL THRESHOLD (msec.)　　1500

—110　　　　　　　　　　　　　　　—56

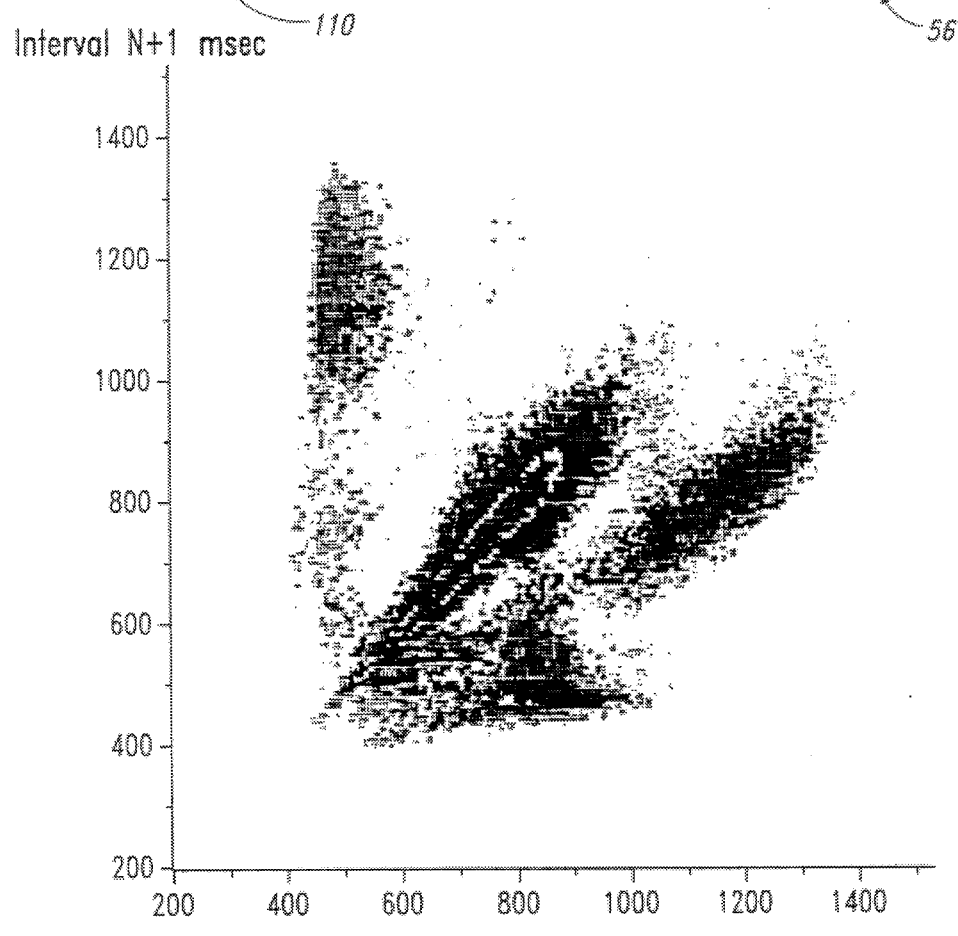

*Fig. 9A*

REGION SUMMARY:

INCLUDED REGION START        1-18:40
INCLUDED REGION END          2-18:12
TOTAL INCLUDED TIME:         23:32
TOTAL INTERVAL PAIRS         11500

LEGEND:   DENSITY

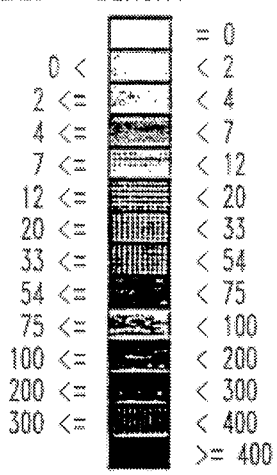

```
       = 0
 0 <   < 2
 2 <=  < 4
 4 <=  < 7
 7 <=  < 12
12 <=  < 20
20 <=  < 33
33 <=  < 54
54 <=  < 75
75 <=  < 100
100 <= < 200
200 <= < 300
300 <= < 400
       >= 400
```

LORENTZ SCATTER PLOT CONFIGURATION

|  | INTERVAL 1 | INTERVAL 2 |
|---|---|---|
| SUPRAVENTRICULAR – SUPRAVENTRICULAR | ☐ | ☐ |
| SUPRAVENTRICULAR – VENTRICULAR | ☒ | ☐ |
| VENTRICULAR – SUPRAVENTRICULAR | ☐ | ☒ |
| VENTRICULAR – VENTRICULAR | ☐ | ☐ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☒ | ☒ |
| NON-PAUSE – NON-PAUSE | ☒ | ☒ |

MINIMUM INTERVAL THRESHOLD (msec.)    200
MAXIMUM INTERVAL THRESHOLD (msec.)    1500

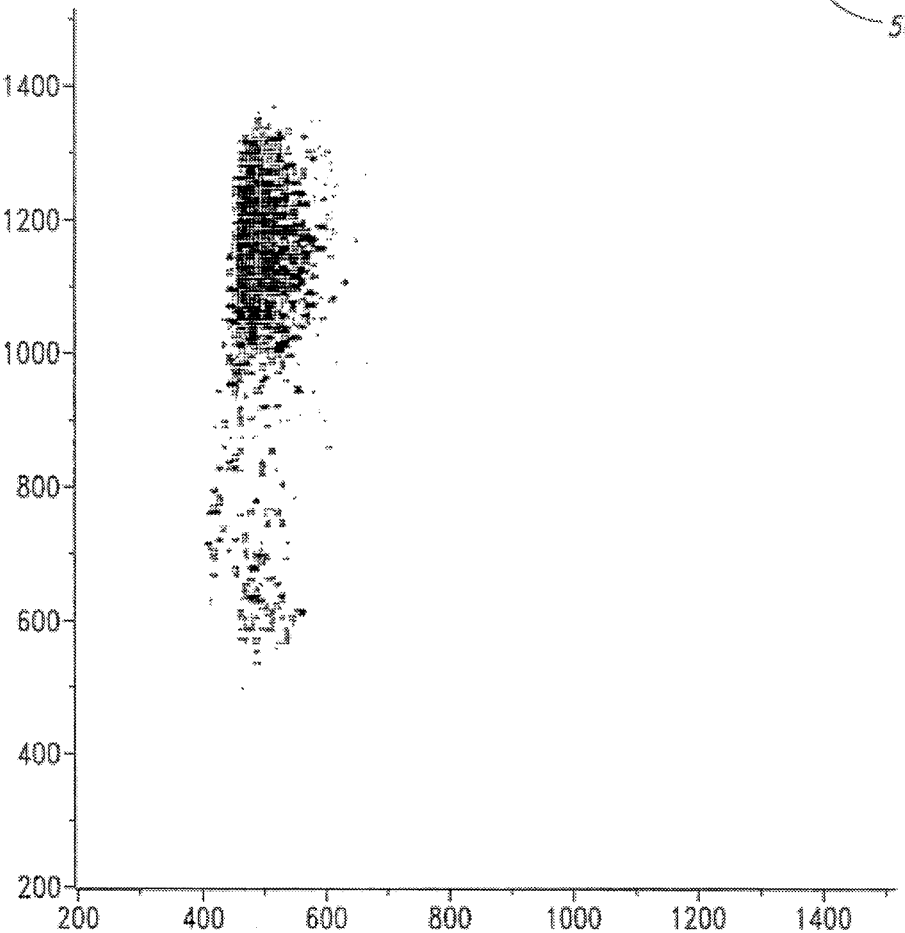

*Fig. 9C*

REGION SUMMARY:

INCLUDED REGION START 1-18:40
INCLUDED REGION END 2-18:12
TOTAL INCLUDED TIME: 23:32
TOTAL INTERVAL PAIRS 12054

LEGEND: DENSITY

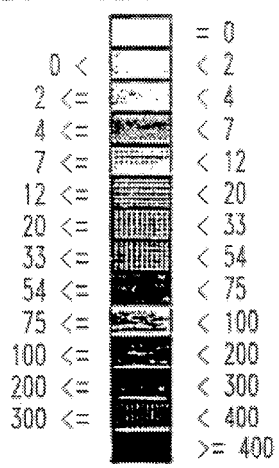

= 0
0 < < 2
2 <= < 4
4 <= < 7
7 <= < 12
12 <= < 20
20 <= < 33
33 <= < 54
54 <= < 75
75 <= < 100
100 <= < 200
200 <= < 300
300 <= < 400
>= 400

LORENTZ SCATTER PLOT CONFIGURATION

|  | INTERVAL 1 | INTERVAL 2 |
|---|---|---|
| SUPRAVENTRICULAR – SUPRAVENTRICULAR | ☐ | ☒ |
| SUPRAVENTRICULAR – VENTRICULAR | ☐ | ☐ |
| VENTRICULAR – SUPRAVENTRICULAR | ☒ | ☐ |
| VENTRICULAR – VENTRICULAR | ☐ | ☐ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☐ | ☐ |
| NON-PAUSE – NON-PAUSE | ☒ | ☒ |

MINIMUM INTERVAL THRESHOLD (msec.) 200
MAXIMUM INTERVAL THRESHOLD (msec.) 1500

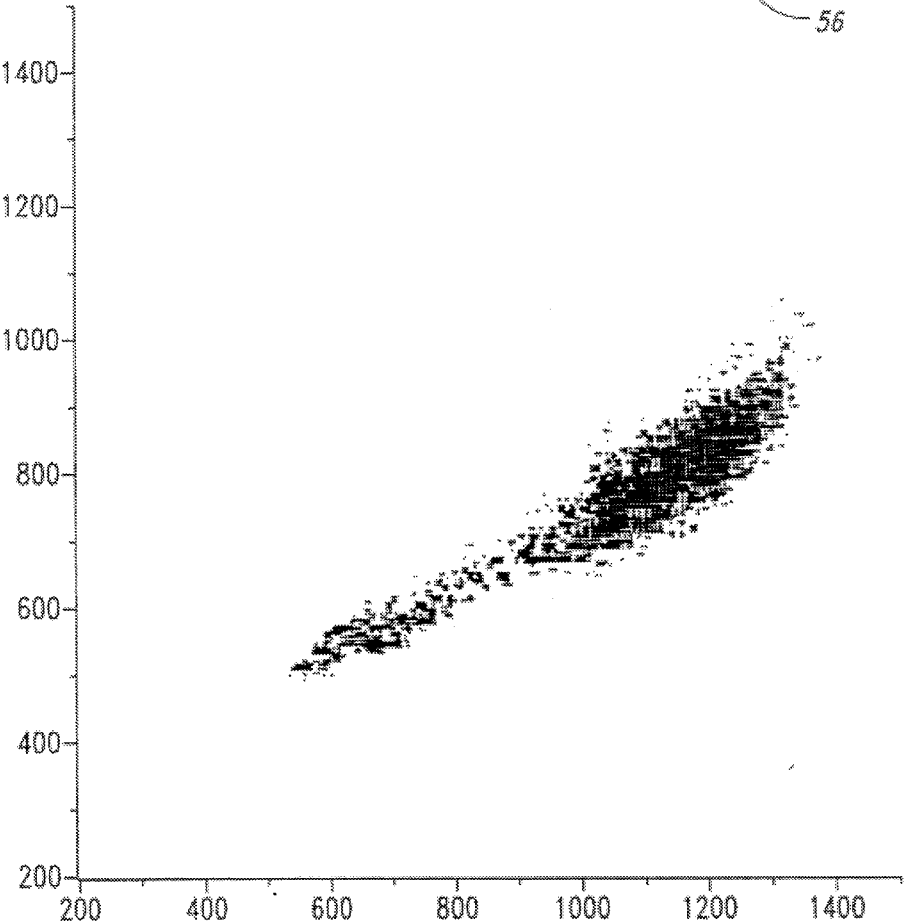

*Fig. 9E*

REGION SUMMARY:

INCLUDED REGION START  1-18:40
INCLUDED REGION END    2-18:12
TOTAL INCLUDED TIME:   23:32
TOTAL INTERVAL PAIRS   695

LEGEND:  DENSITY

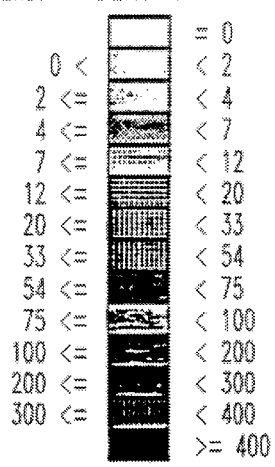

```
  0 <      = 0
       <   < 2
  2 <=     < 4
  4 <=     < 7
  7 <=     < 12
 12 <=     < 20
 20 <=     < 33
 33 <=     < 54
 54 <=     < 75
 75 <=     < 100
100 <=     < 200
200 <=     < 300
300 <=     < 400
           >= 400
```

LORENTZ SCATTER PLOT CONFIGURATION

|  | INTERVAL 1 | INTERVAL 2 |
|---|---|---|
| SUPRAVENTRICULAR – SUPRAVENTRICULAR | ☐ | ☐ |
| SUPRAVENTRICULAR – VENTRICULAR | ☐ | ☐ |
| VENTRICULAR – SUPRAVENTRICULAR | ☐ | ☒ |
| VENTRICULAR – VENTRICULAR | ☒ | ☐ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☒ | ☒ |
| NON-PAUSE – NON-PAUSE | ☒ | ☒ |

MINIMUM INTERVAL THRESHOLD (msec.)   200
MAXIMUM INTERVAL THRESHOLD (msec.)   1500

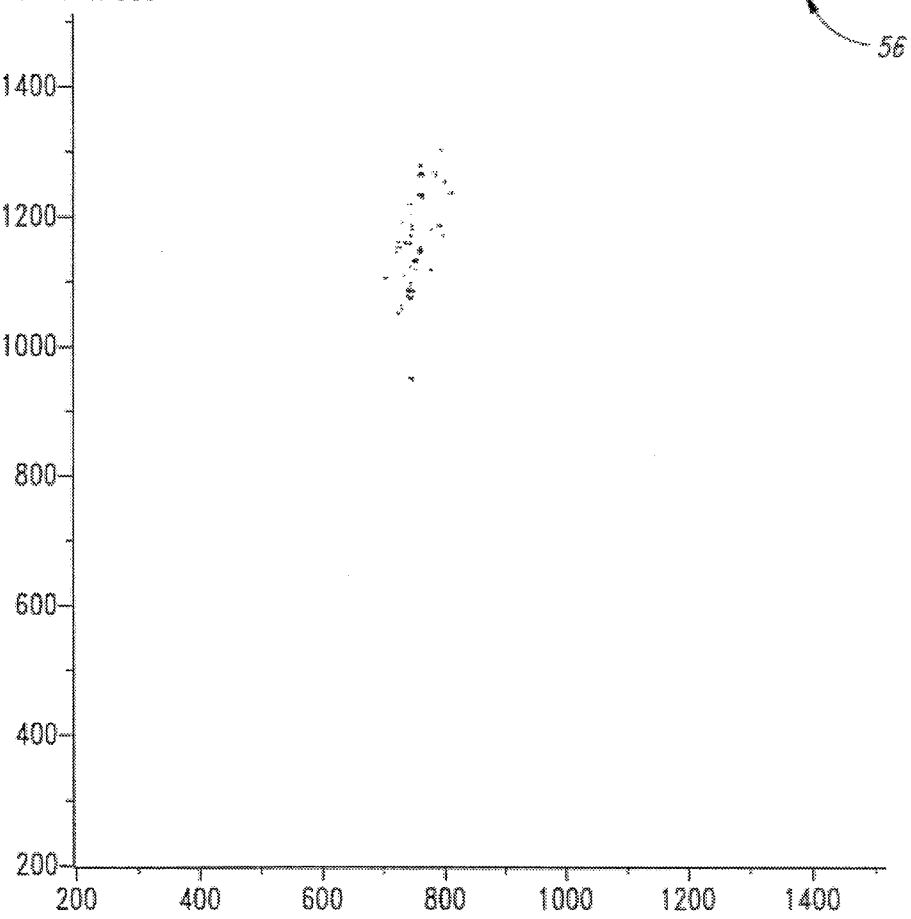

Fig. 9F

REGION SUMMARY:

| | |
|---|---|
| INCLUDED REGION START | 1-18:40 |
| INCLUDED REGION END | 2-18:12 |
| TOTAL INCLUDED TIME: | 23:32 |
| TOTAL INTERVAL PAIRS | 141 |

LEGEND:  DENSITY

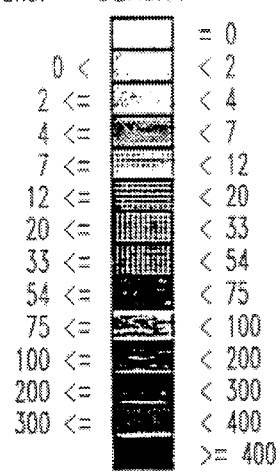

LORENTZ SCATTER PLOT CONFIGURATION

|  | INTERVAL 1 | INTERVAL 2 |
|---|---|---|
| SUPRAVENTRICULAR – SUPRAVENTRICULAR | ☐ | ☐ |
| SUPRAVENTRICULAR – VENTRICULAR | ☐ | ☒ |
| VENTRICULAR – SUPRAVENTRICULAR | ☒ | ☐ |
| VENTRICULAR – VENTRICULAR | ☐ | ☐ |
| SVE – SVE | ☒ | ☒ |
| SVE – NON-SVE | ☒ | ☒ |
| NON-SVE – SVE | ☒ | ☒ |
| NON-SVE – NON-SVE | ☒ | ☒ |
| PAUSE – PAUSE | ☒ | ☒ |
| PAUSE – NON-PAUSE | ☒ | ☒ |
| NON-PAUSE – PAUSE | ☒ | ☒ |
| NON-PAUSE – NON-PAUSE | ☒ | ☒ |
| MINIMUM INTERVAL THRESHOLD (msec.) | 200 | |
| MAXIMUM INTERVAL THRESHOLD (msec.) | 1500 | |

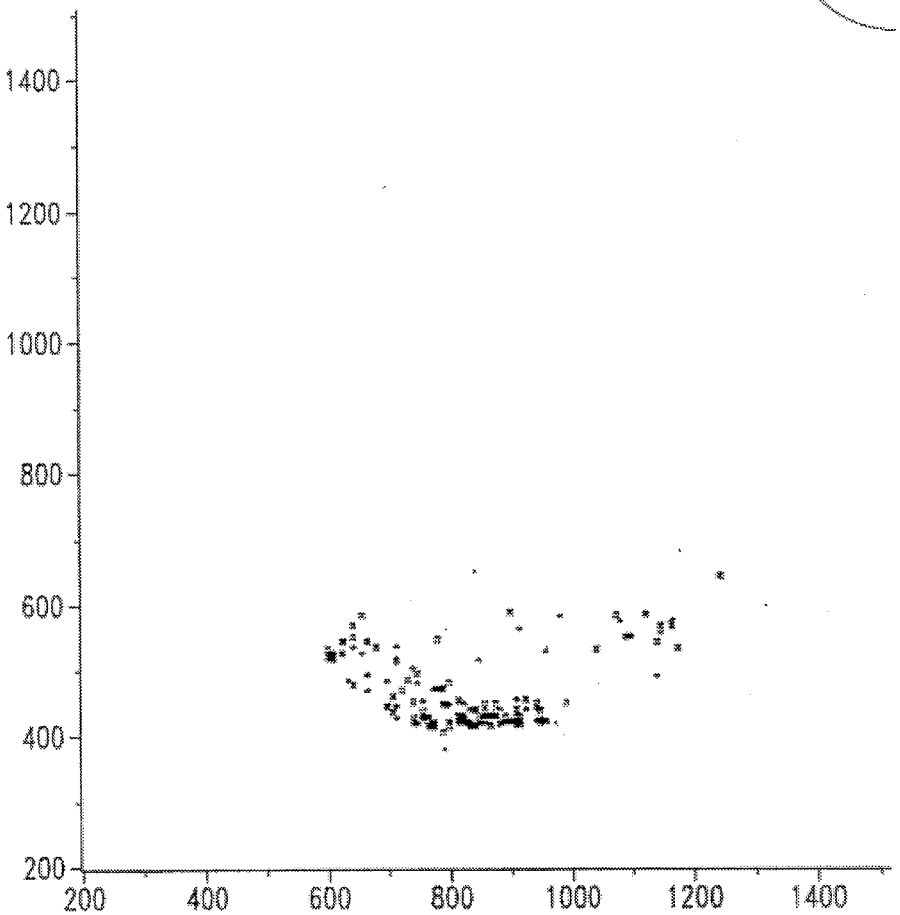

Fig. 9H

SYSTEM AND METHOD FOR DYNAMICALLY DISPLAYING CARDIAC INTERVAL DATA USING SCATTER-PLOTS

TECHNICAL FIELD

The present invention relates generally to the display of graphical data and, more particularly, to the display of scatter-plot data.

BACKGROUND OF THE INVENTION

The use of computers to collect and process data is widespread in virtually every phase of modern society. Computers can collect and process vast amounts of data ranging from accounting spreadsheets and databases to scientific and medical research. While vast amounts of raw data can be collected, processing and presenting the data in a meaningful fashion is often more difficult than the initial collection of the data. It is not uncommon that computers generate more data than can be processed by the person collecting the data. For example, it is possible to collect vast amounts of physiological data for a hospital patient. All of this data must be reviewed and analyzed by a physician or technician for the data to have any relevance to the patient.

The reduction of raw data to a more meaningful form is ever more important in such situations where the physician or technician must review the vast amount of data for a number of patients in the course of a normal workday. There are a variety of techniques known in the art for reducing raw data to a more meaningful form. One such method is the statistical analysis to reduce the raw data to one or more statistical numbers representative of the raw data.

Another technique used to reduce the data is to plot the data in some fashion that simplifies the interpretation of the data. One example of such a plot is termed a scatter-plot, which are sometimes referred to as Lorentz or Poincare plots. Scatter-plots are a powerful graphic tool that can be applied to raw data to reduce to data to a form that can be interpreted in a glance.

Scatter-plots have been used to plot electrocardiograph (ECG) data. In particular, research has shown that plotting the R—R interval of three successive heartbeats of the ECG can produce a useful form of ECG data that can be easily interpreted by the physician. The first R—R interval is the time between the R-waves of the first and second successive heartbeats, respectively, and the second R—R interval is the time between the R-waves of the second and third successive heartbeats, respectively. One R—R interval is plotted on a first axis and the second R—R interval is plotted on the second axis, as shown in FIG. 1.

Some prior art instruments use scatter-plots to display R—R intervals of ECG data to measure the heart rate variability (HRV). Research has shown that HRV is a useful measure of the health of the patient's cardiovascular system. These prior art systems have the limited capability to select which R—R intervals are the most appropriate to include in the scatter-plot. For example, there is only limited selection of the source of heartbeats, such as normal and ectopic heartbeats, that will be included in the scatter-plot. Similarly, prior art systems have limited ability to specify minimum or maximum R—R intervals that will be included in the scatter-plot. The result of such limitations is that data in the scatter-plot include information that is not useful to the physician. The additional data requires additional analysis time by the physician thus reducing the overall effectiveness of this form of graphic presentation.

Therefore, it can be appreciated that there is a great need for a system and method of presenting scatter-plot data in a manner that permits flexibility in the selection of analysis and display parameters. The present invention fulfills this need an provides other advantages as will become apparent from the detailed description.

SUMMARY OF THE INVENTION

The present invention is embodied in a system for the analysis and display of scatter-plot data. An interval monitor calculates first and second cardiac intervals from electrocardiograph data, with the first interval corresponding to a period of time between first and second heartbeats, and the second interval corresponding to a period of time between the second heartbeat and a third heartbeat. A source analyzer determines a beat source for each of the heartbeats with the first and second intervals being calculated only for first, second, and third heartbeats whose beat source matches a set of selected heartbeat sources for the first, second, and third heartbeats. A display having first and second axes, each labeled with a plurality of indicators corresponding to time intervals, displays the first and second intervals as a coordinate pair, with the first interval being displayed as a first coordinate in the coordinate pair using a first axis, and the second interval being displayed as a second coordinate in the coordinate pair using the second axis.

The system may further include selection means for selecting the set of heartbeat sources for the first, second and third heartbeats. The heartbeat sources may comprise at least one of a normal heartbeat, a ventricular heartbeat, a pacer heartbeat, and an intrinsic heartbeat.

The system may further include a heartbeat analyzer to determine a clinical type for each of the first, second, and third heartbeats, with the first and second intervals being calculated only for first, second and third heartbeats, whose clinical type matches a selected clinical type for the first, second and third heartbeats. The system also includes selection means for selecting the clinical type for the first, second, and third heartbeats. The clinical type comprises at least one of a premature atrial complex clinical type and a pause clinical type.

The system may further include timer means to measure a predetermined threshold time criterion, with the first and second intervals being calculated only for first, second, and third heartbeats whose intervals meet the predetermined threshold time criterion. The system includes user selectable means for altering the predetermined threshold time criterion. The predetermined threshold time criterion may be a minimum threshold time, with the first and second intervals being calculated only for first, second, and third heartbeats whose intervals are greater than the minimum threshold time. The predetermined threshold time may be a maximum threshold time, with first and second intervals being calculated only for first, second, and third heartbeats whose intervals are less than the maximum threshold time. As a result, the system can include only heartbeats that satisfy the minimum and maximum threshold times.

The first, second, and third heartbeats may be successive heartbeats. The electrocardiograph data may be generated by a cardiac monitor electrically coupled to a patient. Alternatively, the electrocardiograph data may be stored in a data file.

In another embodiment, the system comprises storage means for storing electrocardiograph data collected from a patient over a predetermined period of time. An interval monitor calculates first and second cardiac intervals for the predetermined period of time, with the first interval corresponding to a period of time between first and second heartbeats, and a second interval corresponding to a period of time between the second heartbeat and a third heartbeat. A display having first and second axes displays first and second intervals as a plurality of coordinate pairs with each of the first intervals being displayed as a first coordinate in the coordinate pair using the first axis, and each of the second intervals being displayed as a second coordinate in the coordinate pair using the second axis. The system includes selection means for selecting a particular one of the plurality of coordinate pairs on the display, and a display means for displaying the electrocardiograph data associated with the selected coordinate pair.

The system may further include a current selection means for selecting a particular one of a plurality of occurrences of the selected coordinate pair, with the display displaying the electrocardiograph data associated with the selected occurrence. The occurrence selection means may include a scroll bar to permit the user to scroll through the plurality of occurrences of the selected coordinate pair with the display displaying the electrocardiograph data associated with each of the scrolled occurrences.

In yet another embodiment, the display is a greyscale monitor having a plurality of intensity data values corresponding to a plurality of display intensities or a multicolor monitor having a plurality of data values representing a color corresponding to a plurality of colors. The data values have an initial value such that the coordinate pairs are not visible on the display. The display increases the value corresponding to a particular one of the coordinate pairs each time that the scatter-plot data corresponds to a particular coordinate pair such that the particular coordinate pair has a higher intensity value or a different color value each time the scatter-plot data, corresponds to the particular coordinate pair. As a result, the user can easily determine the frequency of occurrence of a particular coordinate pair based on the intensity or color.

The display may alter the intensity or color in a first manner by incrementing the data values. The system may further include timer means for measuring a predetermined period of time to alter the intensity or color for a particular coordinate pair in a second opposite manner if the scatter-plot data does not correspond to the particular coordinate pair within the predetermined period of time. Alternatively, the system may include timer means for measuring a predetermined period of time, with the display resetting the intensity value for the particular coordinate pair to the initial intensity value if the scatter-plot data does not correspond to the particular coordinate pair within the predetermined period of time. The system further includes the user's selectable means for altering the predetermined period of time. As a result, the user can easily examine the data and dynamically view the changes in the frequency of occurrence of coordinate pairs over a user selectable period of time.

In yet another alternative embodiment, the system stores scatter-plot data collected during a first period of time. The system includes user selectable means for selecting a second period of time less than the first period of time, with the display displaying the stored coordinate pairs corresponding to the scatter-plot data for the second period of time such that the user can review the stored coordinate pairs for any portion of the first period of time in increments of the second period of time. As a result, the user can examine the entire data collection period in increments of user selectable time periods.

If the display is a greyscale or color display, the system may display coordinate pairs for two of the second periods of time, with the coordinate pairs for each of the second periods of time being displayed with a different intensity or color.

In yet another embodiment, the system includes selection means for selecting a particular one of the coordinate pairs displayed on the display. Display means are also included for displaying the raw data corresponding to the selected coordinate pair. The system may further include occurrence selection means for selecting a particular one of a plurality of occurrences when the raw data corresponds to the selected coordinate pair a plurality of occurrences during the period of time, with the display displaying the raw data corresponding to the selected occurrence. The occurrence selection means may include a scroll bar to permit the user to scroll through the plurality of occurrences with the displaying the raw data corresponding to each of the scrolled occurrences. This allows the user to examine the raw data that resulted in a particular data pair to be recorded.

In yet another embodiment, a system for the evaluation of scatter-plot data comprises storage means for storing a scatter-plot data file corresponding to a predefined normal pattern. Comparison means are used to compare the scatter-plot data with the stored scatter-plot data file. Difference means are provided to calculate a difference between the scatter-plot data and the stored scatter-plot data file.

The comparison means may calculate a first area of a predetermined portion of the stored scatter-plot data file and a second area of the predetermined portion of the scatter-plot data. The difference means calculates the difference by calculating the difference in the first and second areas.

BRIEF DESCRIPTION OF THE DRAWINGS

FIGS. 8A through 8D are scatter-plots generated by the system of FIG. 2 for a patient having an implanted demand pacemaker.

FIGS. 9A through 9H are scatter-plots generated by the system of FIG. 2 for a patient having frequent cardiac irregularities.

DETAILED DESCRIPTION OF THE INVENTION

Prior an ECG systems have only limited selection of analysis and display parameters. In contrast, the present invention permits great flexibility in the selection of analysis parameters so that unwanted data is not included in the scatter-plot display. Furthermore, the present invention permits the selection of a variety of display parameters that further reduce vast amounts of data to a simple scatter-plot display in which only the desired data is displayed. While the examples presented herein relate to the analysis and display of ECG data, it is obvious to those of ordinary skill in the art that the principles of the present invention are applicable to any form of scatter-plot display.

Figure 1:
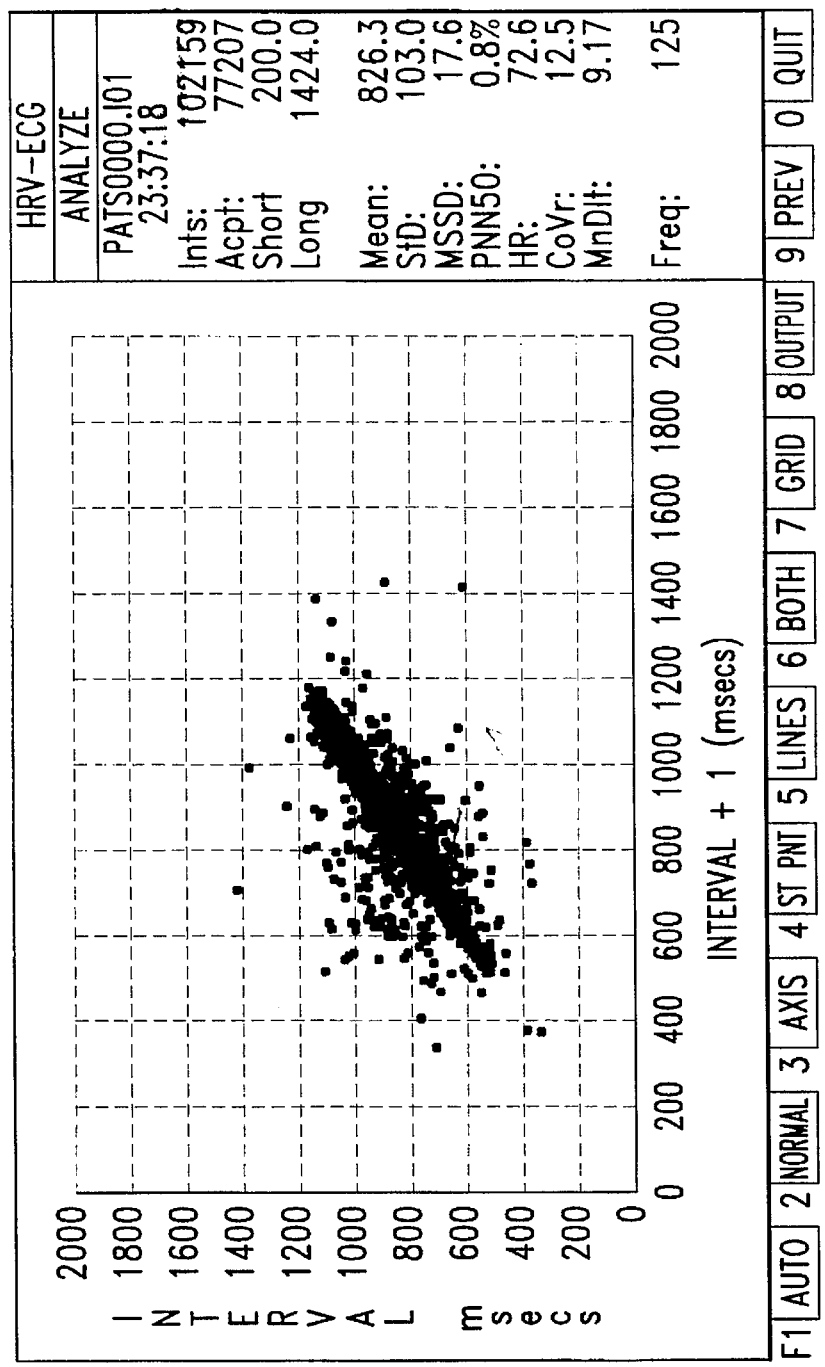
FIG. 1 illustrates a scatter-plot of the prior art.
Figure 2:
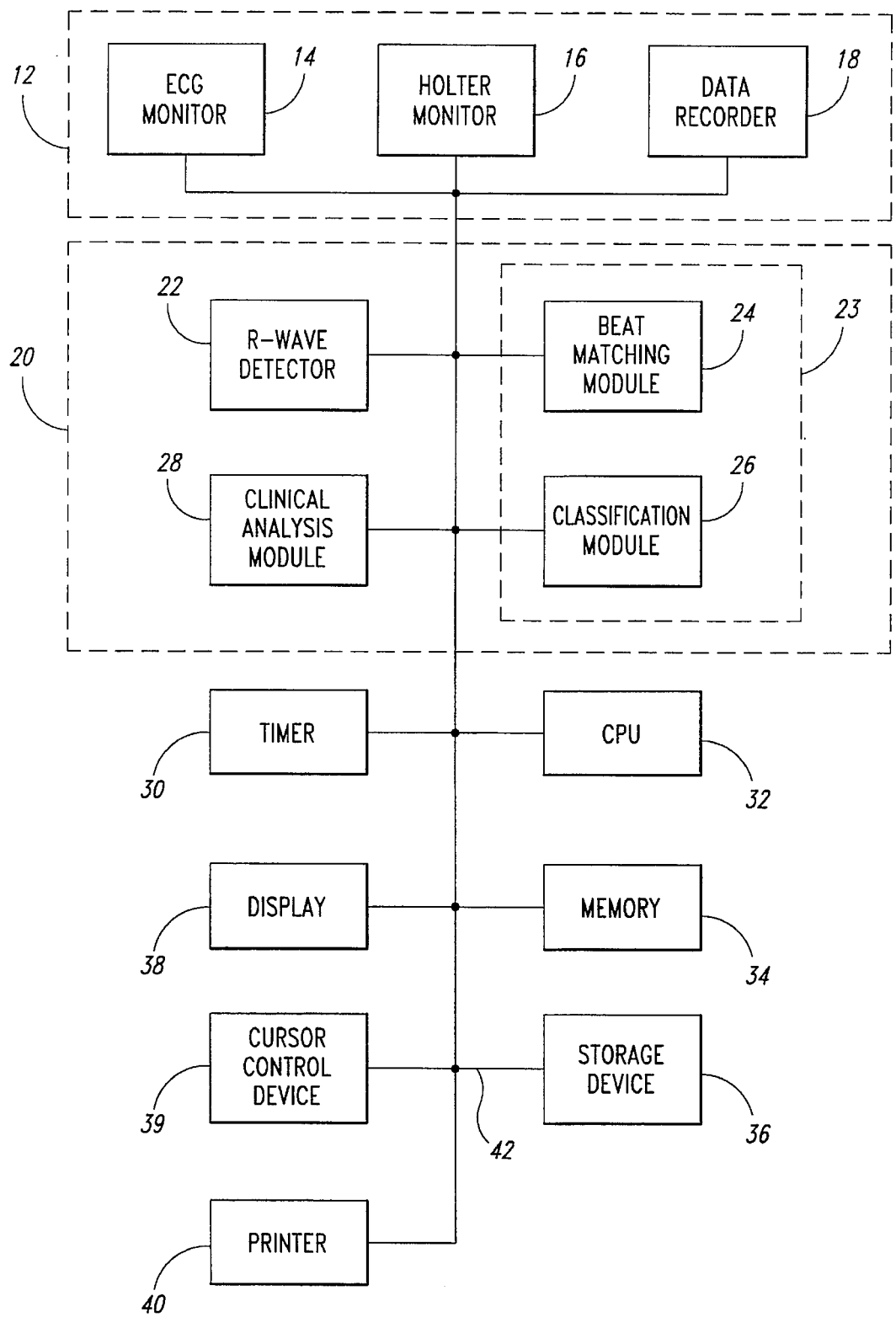
FIG. 2 is a functional block diagram of the present invention.

The present invention is embodied in a system 10 shown in the functional block diagram of FIG. 2. The data is provided to the system 10 by a data input module 12. The data input module 12 may be a conventional ECG monitor 14 that provides real-time ECG data to the system 10, a conventional Holter monitor 16 that provides recorded ECG data to the system, or a data recorder 18 that provides recorded data to the system. The data recorder 18 may be in the form of an analog tape, or a digitized waveform. The precise form of data input to the system 10 should not be considered a limitation in the present invention. The data from the data input module 12 may be digitized by an analog to digital converter (not shown) prior to being analyzed by the system 10. This is particularly useful when the system 10 uses a microprocessor to perform many of the analysis functions.

The ECG data waveform from the data input module 12 is analyzed by an ECG waveform analyzer module 20 to detect the heartbeats, analyze the heartbeats, and classify the heartbeats. The ECG waveform analyzer module 20 is described in U.S. Pat. No. 5,291,400, which is incorporated herein by reference. Operation of the waveform analyzer module 20 will only be described briefly herein.

A conventional microprocessor timer 30 permits the user to select threshold times as analysis parameters to control the manner in which data is collected, and to select various times as display parameters to control the manner in which the scatter-plot data is displayed. In practice, there may be one or more independent timers 30 to measure various time intervals. Many of the analysis and control functions of the system 10 are performed by a central processing unit (CPU) 32. The system 10 includes a memory 34, which may comprise both random access memory (RAM) and read-only memory (ROM). The system 10 may also include a storage device 36, such as a disk drive to provide nonvolatile storage of data. Also included in the system 10 is a display 38 to display the scatter-plot data. The display is also used to display menus containing instructions for the user and to permit the user to select parameters using a cursor control device 39, such as a mouse, trackball, light pen, or the like. The cursor pointing device generally includes a command button (not shown), such as a mouse button, to permit the entry of a command to the system 10. The selection of parameters using the display 38 will be discussed in detail below. The system 10 also can include a printer 40 to print the scatter-plot data. The various components of the system 10 are coupled together by a bus 42, which may carry power as well as data signals.

The ECG waveform is provided to the waveform analyzer module 20 by the data input module 12. An R-wave detector circuit 22 within the waveform analyzer module 20 detects the R-wave of each heartbeat. The circuitry used by the R-wave detector 22 is well known in the art and will not be described herein. The R-wave detector circuit 22 generates a detection signal each time that an R-wave is detected. The detection signal from the R-wave detector circuit 22 is used by the system 10 to measure the R—R intervals between heartbeats. Alternatively, other points on the ECG waveform could be used to determine the interval time between heartbeats. The detection signal from the R-wave detector circuit 22 is also be used to measure the heart rate. The user can select heart rate as an analysis parameter. For example, the user can elect to display scatter-plot data only for heartbeats where the heart rate exceeds a user selected threshold, such as 80 beats per minute (bpm).

The ECG waveform analyzer module 20 also includes several data analysis modules to select heartbeats that satisfy a plurality of analysis parameters. The system 10 need only display the R—R interval for heartbeats that satisfy the selected analysis parameters. A beat source analyzer 23 determines the source of each heartbeat detected by the R-wave detector circuit 22. Normal heartbeats are generated by a bioelectric source in the sinoatrial node of the heart. However, abnormal heartbeats can be generated by other sources within the heart, such as the supraventricular portion of the heart. Patients may have a pacemaker, which generates pacer signals to trigger a heartbeat. The beat source analyzer 23 analyzes each detected heartbeat to determine if it was intrinsically generated or extrinsically generated (i.e., a pacer triggered heartbeat) and determines the source of intrinsic heartbeats.

The beat source analyzer 23 includes a beat matching module 24 that receives the raw data and categorizes each heartbeat into similarly shaped heartbeats. As can be appreciated, There may be many categories of heartbeats as well as noise signals that have been detected by the R-wave detector circuit 22. The beat matching module 24 creates a series of bins in which to store the similarly shaped heartbeats.

Once the heartbeats have been placed into bins based on the similarity of shapes, a beat classification module 26 analyzes the ECG data and classifies each heartbeat. The beat classification module 26 labels each heartbeat based on the source of the beat. As discussed above, the beat source analyzer 22 detects a variety of heartbeat sources, including intrinsic and extrinsic heartbeats. Intrinsic heartbeats are further classified as a normal heartbeat (i.e., generated in the sinoatrial node), a ventricular heartbeat, and artifact. The beat classification module 26 also classifies and labels extrinsic (i.e., pacemaker) generated heartbeats. This is particularly useful to allow the physician to analyze the operation of a pacemaker by examining only pacer generated heartbeats. The classification of heartbeats is well known in the art and will not be discussed herein.

Figure 3:
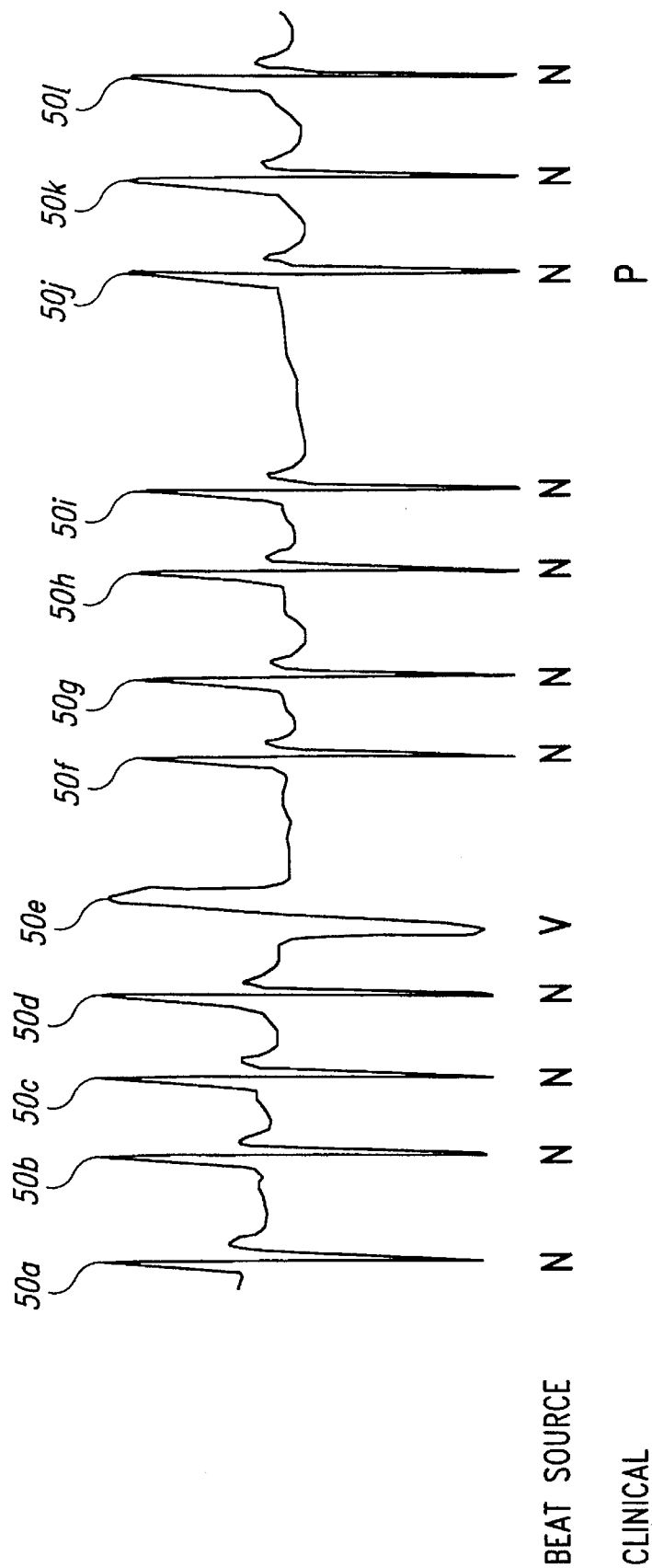
FIG. 3 is a sample ECG waveform processed by the system of FIG. 2 to include beat source and clinical type labels.

A clinical analysis module 28 provides further analysis of the ECG waveform to determine the clinical type of each waveform. As is well known in the art, heartbeats can be labeled according to a plurality of clinical labels based on different types of rhythmic patterns that are determined by analyzing the R—R interval. For example, an abnormal contraction of the heart can be caused by a premature atrial complex (PAC). A failure of the cardiac muscle to conduct electrical signals can result in a skipped or delayed heartbeat, which is clinically classified as a "pause." A sample ECG waveform, including the heartbeat source and clinical labeling, is shown in FIG. 3. A plurality of heartbeats 50a through 50l are labeled with the source of the heartbeats. The heartbeats 50a through 50d and 50f through 50l are normal heartbeats (i.e., generated in the sinoatrial node), while a single heartbeat 50e is labeled as a ventricular heartbeat. The heartbeats 50a through 50l are further labeled with clinical labels based on the R—R interval. There is a longer interval between the heartbeats 50i and 50j than between the remaining heartbeats. Therefore, the heartbeat 50j receives the clinical pause label indicating the unusually long interval.

The system 10 permits the physician to select the specific heartbeat source and/or clinical label parameters for analysis. Unlike prior art systems, the system 10 of the present invention permits the user to select the heartbeat source and clinical label parameters for each interval pair. Thus, the user can select the specific analysis parameters for each of the two intervals of the scatter-plot. The system 10 will only display scatter-plot data that corresponds to the selected analysis parameters. This greatly reduces the amount of data presented to the physician, which saves time in analysis and allows the physician to focus his attention on the data of significance without the distraction of unwanted data on the scatter-plot. Techniques used to determine the clinical type are well known in the art and will not be discussed herein.

The system 10 also permits the user to select analysis timing parameters and display intervals. The timer 30 provides the necessary timing information for the system 10. The timer 30 can be used to provide analysis timing parameters, such as the display of R—R intervals that exceed a user selected minimum threshold, such as 200 milliseconds and/or a maximum interval threshold, such as 1400 milliseconds. If minimum and maximum thresholds are selected by the user, the system 10 will only display scatter-plot data for R—R intervals that exceed the minimum threshold and are less than the maximum threshold. The selection of threshold intervals is yet another example of the selective display of data that meets the selected analysis parameters. This permits the physician to review only the desired data, which saves time and simplifies the analysis process.

Figure 4:
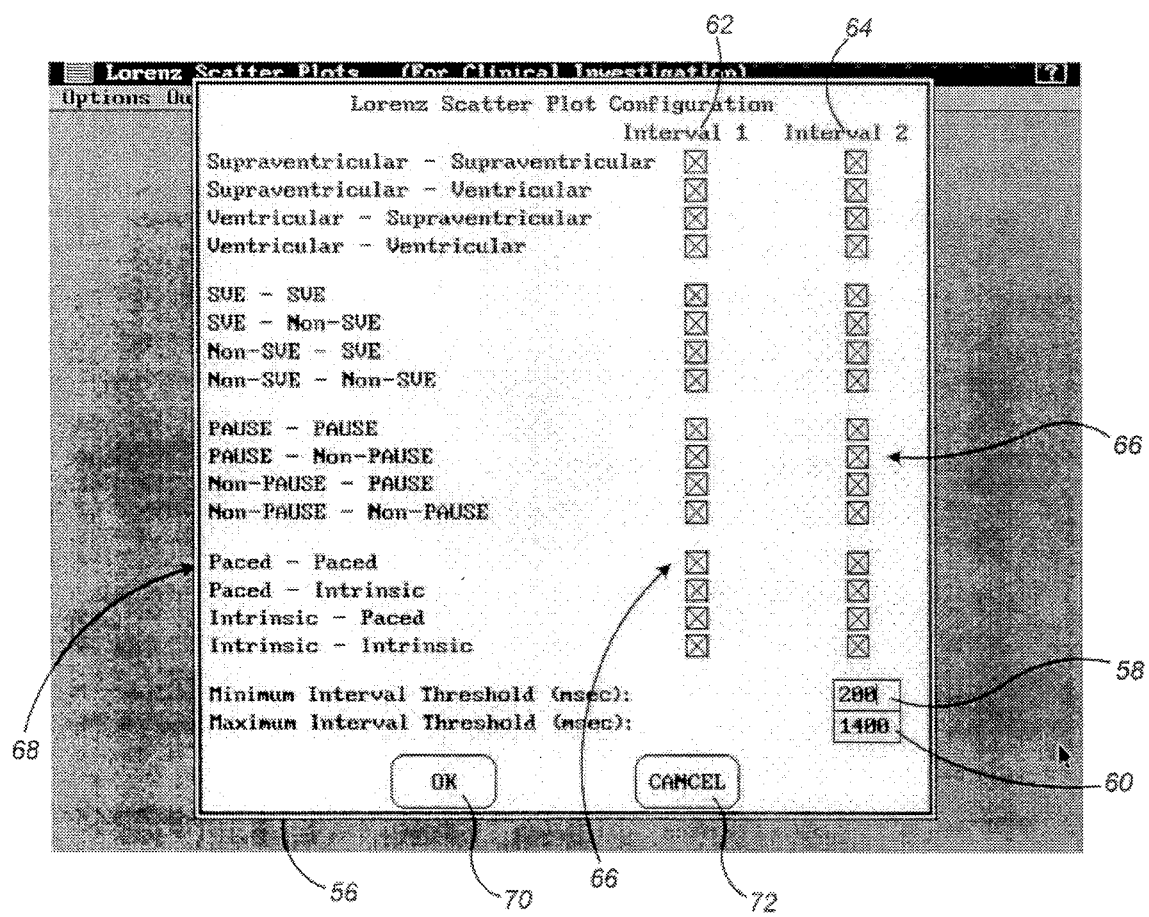
FIG. 4 is a menu displayed by the system of FIG. 2 to select analysis parameters.

The selection of analysis parameters is illustrated in FIG. 4 where a configuration menu 56 is displayed on the display 38. The configuration menu 56 indicates the current analysis parameters, including a selected minimum threshold time display 58 and a selected maximum threshold time display 60. The user can select minimum or maximum threshold times by positioning the cursor control device 39 over the desired minimum or maximum threshold time displays 58 and 60, respectively, and clicking the command button (not shown). The user can alter the selected threshold time using a keyboard (not shown) or other data entry device. Alternatively, the display 38 may display an additional menu to permit the user to alter the selected threshold time. If the user attempts to select invalid threshold times, such as a minimum threshold time that exceeds the maximum threshold time, the system 10 will generate an error message informing the user of the invalid parameter selection.

A variety of beat source types and clinical labels are shown on the configuration menu 56. The display 38 also includes columns 62 and 64 containing a plurality of selection boxes 66 corresponding to each of the analysis parameters for the first and second intervals, respectively. The user positions the cursor control device 39 over one of the selection boxes 66 in one of the columns 62 and 64 and clicks to select a desired analysis parameter for a particular interval. For example, the user can monitor only paced heartbeats followed by intrinsic heartbeats for interval 1 by positioning the cursor control device over the selection box 66 in the column 62 corresponding to a Paced-Paced analysis parameter 68 and clicking a control button (not shown), such as a mouse button. A different beat source parameter can be selected for interval 2 in the manner described above. Furthermore, the user can select additional beat source parameters and clinical labels for each of the two intervals. A selected parameter can be deselected by clicking the control button (not shown) a second time. In the example of FIG. 4, all of the analysis parameter options have been selected as indicated by the "x" in each of the selection boxes 66. In this case, the system 10 will include all detected heartbeats in the analysis. The user can confirm the selection of the analysis parameters by positioning the cursor over an OK button 70 on the configuration menu 56 and pressing the command button (not shown). The user can cancel the selection of the analysis parameters by positioning the cursor over a CANCEL button 72 on the configuration menu 56 and pressing the command button (not shown). The system 10 will display an error message if an invalid analysis parameter combination is selected by the user. For example, the selection of Paced-Paced for the interval 1, as described above, combined with the selection of Intrinsic-Paced for interval 2 cannot produce any data points for the scatter-plot because the second heartbeat cannot be both paced and intrinsic as required by the selection of parameters in this example. Therefore, the system 10 generates an invalid parameter selection any time there is a combination of analysis parameters that cannot produce any scatter-plot data.

As can be appreciated, there are numerous techniques well known in the art for the display and selection of data. The example shown in FIG. 4 with the display of the menu 56 and the selection of parameters using the cursor control device 39 is intended to illustrate one such technique. The present invention is not limited by the manner in which the parameters are displayed and selected.

Figure 5:
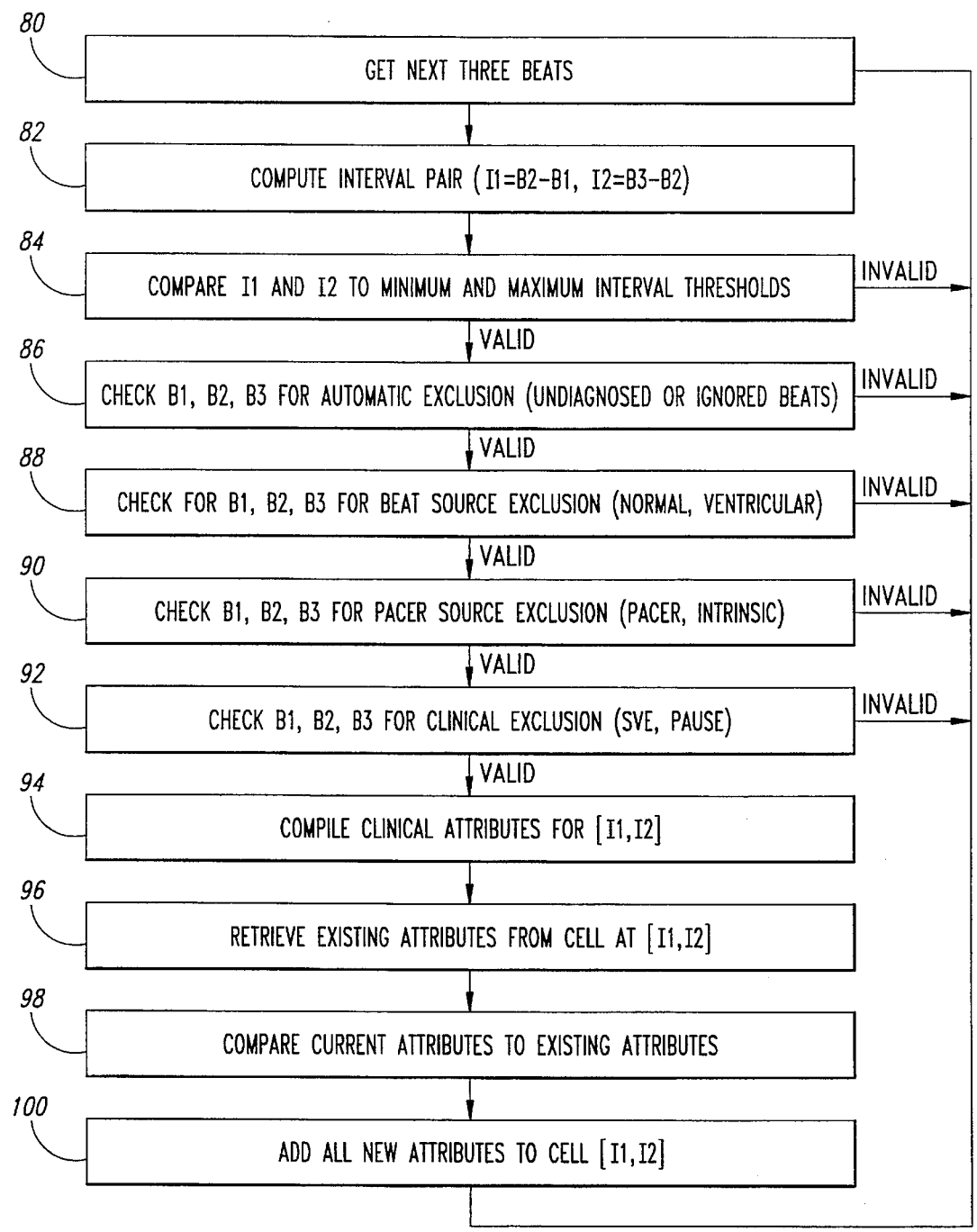
FIG. 5 is a flow chart of the operation of the system of FIG. 2 for the processing of analysis parameters.

The operation of the system 10 for analysis of the interval pairs is illustrated in the flow chart of FIG. 5. In step 80, the system 10 retrieves the next three heartbeats for analysis. As previously discussed, the ECG data can be provided to the system in a number of different manners. In step 82 the system 10 computes the interval pair, with the first interval, I1, being the time between the first and second heartbeats and the second interval, I2, being the time between the second and third heartbeats. It is obvious to those skilled in the art that one could select more than a plurality of heartbeats and calculate intervals based on the selected number of heartbeats.

In step 84, the system 10 compares the intervals, I1 and I2, to the minimum and maximum thresholds. If the intervals, I1 and I2, are not within the specified thresholds, the intervals, I1 and I2, are invalid, and the system 10 returns to step 80 to retrieve the next three heartbeats. It should be noted that the system 10 uses the second and third heartbeats of the previous analysis and redesignates them as the first and second heartbeats. The system will retrieve a single heartbeat and designate it as the third heartbeat. The analysis of the three heartbeats is then performed in the manner described above. In this manner, all possible interval pair combinations will be analyzed by the system 10.

If the intervals, I1 and I2, fall within the specified thresholds, the intervals, I1 and I2, are valid, and the system 10 continues the analysis. In step 86 the system 10 checks the heartbeats for excluded heartbeats, which are undiagnosed as to source or clinical label, or have been ignored by the system as noise or artifact. If any of the three heartbeats fall into the category of excluded heartbeats, the heartbeats are invalid and the system 10 returns to step 80 to retrieve the next three heartbeats. If none of the three heartbeats are in the excluded category, the heartbeats are still considered valid. In step 88, the system 10 compares the heartbeats to the beat source selection parameters. If the heartbeats do not meet the specified criteria for the beat source selection parameters, the heartbeats are considered invalid, and the system 10 returns to step 80 to retrieve the next three heartbeats. If the heartbeats meet the beat source criteria, the heartbeats are still considered valid. In that event, the system 10, in step 90, compares the heartbeats to the selected beat source criteria for intrinsic and paced beat sources. If the heartbeats do not meet the specified criteria for the intrinsic/paced beat source selection parameters, the heartbeats are considered invalid, and the system 10 returns to step 80 to retrieve the next three heartbeats. If the heartbeats meet the intrinsic/paced beat source criteria, the heartbeats are still considered valid. In that event, the system 10, in step 92, compares the heartbeats to the selected clinical label criteria. If the heartbeats do not meet the specified clinical label criteria, the heartbeats are considered invalid, and the system 10 returns to step 80 to retrieve the next three heartbeats. If the heartbeats meet the specified clinical label criteria, the heartbeats are still considered valid. If the three heartbeats are still valid following step 92, the interval pair may be classified as a qualified interval pair, and can be added to the scatter-plot data.

In step 94, the system 10 compiles the clinical attributes for the qualified interval pair. The attributes for a qualified interval pair includes all of the analysis parameters discussed above, as well as time attributes indicating the time at which a particular qualified interval pair occurred within the ECG waveform. The attributes for each qualified pair are stored in a data array within the memory 34 (see FIG. 2) and are used to select particular qualified pairs for display, as will be explained below. In step 96, the system 10 retrieves the existing attributes for the location in the scatter-plot data corresponding to the qualified interval pair. In step 98, the system 10 compares the existing attributes retrieved from the scatter-plot data with the attributes compiled in step 94. Step 98 is particularly useful when the display 38 is a multicolor monitor. The system 10 may designate heartbeats corresponding to a one beat source as having one color, while heartbeats corresponding to a second beat source have a second color. If a particular interval pair has heartbeats occurring from both the first and second beat sources and both beat sources are selected for the scatter-plot, the location in the scatter-plot corresponding to the particular interval pair has a color that is the combination of both the first and second colors. The system 10 compares existing attributes with the current attributes to derive the new color for the scatter-plot. As a result, the user can easily see that some interval pairs have a different color because they are the result of different beat sources. In step 100 the new attributes compiled in step 94 are added to the data array in the memory 34 for the particular qualified pair. The process described above is repeated for each heartbeat in the ECG waveform.

Thus, the system 10 provides powerful analysis tools for the user by permitting the custom selection of a variety of parameters for each of the intervals for the scatter-plot data. In addition to the selection of analysis parameters, the system 10 also permits the user to select a wide range of powerful display parameters to assist the user in analyzing vast amount of data in a format with that is easy to interpret.

A patient is often monitored for long periods of time thus generating large amounts of data. The system 10 can be used to select scatter-plot data that corresponds to user selected time criteria. For example, the system 10 can provide scatter-plot data for a 24 hour data collection period, such as is common when using a Holter monitor. The user can select display parameters to permit the display of the entire 24 hour period in a single scatter-plot on the display 38. To provide more detailed analysis of the scatter-plot data, the user can select a time interval, such as a 15 minute interval, and view for scatter-plot data for the entire 24 hour period in 15 minute intervals. Alternatively, the user can compare two or more intervals in a successive scatter-plots on the display 38. For example, the user may wish to compare scatter-plot from periods when the subject is awake to periods when the subject is asleep. The user specifies the desired time range, and the system 10 analyzes the attribute data stored in the data array in the memory 34 (see FIG. 2) to retrieve qualified interval pairs that have the appropriate time attribute. It should be noted that a particular interval pair may have occurred numerous times throughout the data collection period. Each time that a particular qualified interval pair occurred, the attribute data, including time attribute data, were stored in the memory 34 for that particular qualified interval pair. Thus, the user can select any desired time interval, and the system 10 will display only the qualified interval pair that have the correct time attribute. This flexibility in the display parameters permits the physician to examine and compare data from virtually any interval during the data collection period.

The memory 34 (see FIG. 2) is used to store attribute data such as measured time intervals, heartbeat data, analysis and display parameters, and the like for each qualified interval pair, as discussed above. The ECG waveform itself may also be stored in the memory 34 or in the storage device 36. The storage device 36 can store ECG data for extended measurement periods and permit the subsequent retrieval of ECG data associated with a particular qualified interval pair. For example, there may be a cluster of qualified interval pairs that the user may wish to analyze in greater detail. The user can select any qualified interval pair display on the scatter-plot data on the display using the cursor control device 39 (see FIG. 2) and depressing command button (not shown). In response to the selection of a particular qualified interval pair, the system 10 retrieves the actual ECG waveform that corresponds to the selected interval pair. The ECG waveform can be displayed on the display 38 or printed along with the scatter-plot data on the printer 40 (see FIG. 2). This permits the user to review the actual waveform that created the selected interval pair. In some cases, there may be more than one occurrence of the selected interval pair. In that event the display 38 includes an occurrence selection control, such as a scroll bar or scroll arrows, to permit the user to move from one occurrence of the selected interval pair to another in a simple fashion. As the user moves from one occurrence of the selected interval pair to another, the system 10 causes the ECG waveform corresponding to the selected occurrence to be shown on the display 38. Thus, the user may scroll through a plurality of occurrences of any selected interval pair and review the ECG data corresponding to each selected interval pair.

The ECG data review feature of the system 10 also provides editing features to re-diagnose beat source, clinical label, and intrinsic/paced source. With this editing feature the user can create any missing beats or delete any extra beats that the system 10 detects. When beats are edited, deleted or created the system 10 updates the scatter-plot to reflect the new data. This editing feature can be used to correct infrequent analysis errors which may be revealed by the scatter-plot.

Figure 6:
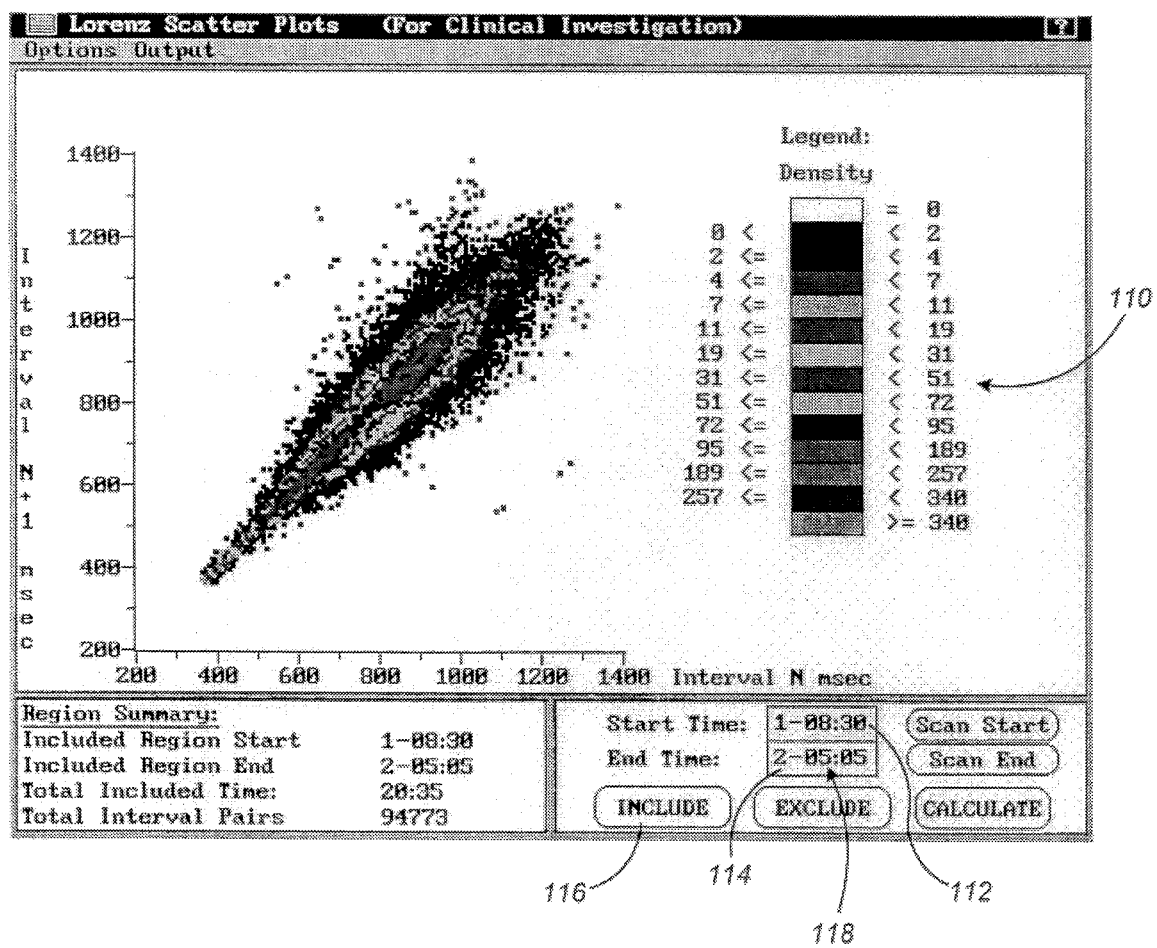
FIG. 6 is a scatter-plot display generated by the system of FIG. 2.

The display 38 comprises a series of pixels that form an array of pixels in two dimensions, which may be thought of as having X and Y coordinates. One or more pixels are lighted on the display 38 in a position corresponding to the X and Y coordinates for the first interval and the second interval, respectively. The term "lighted", as used herein, refers to pixels that are visible on the display. In a simple scatter-plot display, such as those found in the prior art, the display has a single data bit to indicate whether or not the pixel will be lighted. In contrast, the presently preferred embodiment of the system 10 includes a gray-scale monitor or a color monitor as the display 38. A gray-scale display 38 has a plurality of data bits corresponding to each pixel. The value of the data bits are indicative of the intensity with which a pixel is lighted. For example, the gray-scale display 38 may have eight data bits corresponding to each pixel. Other numbers of data bits can be used to provide different intensity ranges. With eight data bits representing intensity, the gray-scale display 38 has 256 possible levels of intensity ranging from black to white thus permitting far greater detail to be shown in the scatter-plot data. For example, some interval pairs may occur only one time during the data collection period, while other interval pairs may occur repeatedly. Prior art systems cannot differentiate between a single occurrence of an interval pair and an interval pair that has occurred repeatedly. In contrast, the gray-scale display 38 can show the user, at a glance, the frequency with which interval pairs occurred. A sample scatter-plot of a normal heart using the gray-scale display 38 is shown in FIG. 6. In FIG. 6, the interval pairs with the greatest rate of occurrence are indicated with the darkest portion of the display. Each time that an interval pair corresponds to a particular pixel or pixels, the intensity value is incremented. Alternatively, the intensity value could be changed by some other value. The specific intensity values may also be dependent on the interface hardware for the display 38. A density scale 110 may also be included to provide the user with a quantitative measure of the frequency of occurrence for the interval pairs. The gray-scale display 38 also provides display data to the user in addition to the scatter-plot data. A start time display 112 and stop time display 114 for data included in the scatter-plot is shown on the gray-scale display 38. As previously discussed, the user can select any interval of the data collection period to include in the scatter-plot by selecting the desired start and stop times. To select a start and/or stop time, the user positions the cursor over the start time display 112 or stop time display 114 and presses the command button (not shown). A keyboard or other means for entering the desired times is provided. The user can include data from the selected time range by positioning the cursor over an INCLUDE button 116 and pressing the command button (not shown). Alternatively, the user can exclude the data corresponding to the selected time range by positioning the cursor over an EXCLUDE button 118 and pressing the command button (not shown). The exclude feature allows the user to eliminate undesired data, such as might be generated if an ECG electrode lead becomes detached.

The user can also select from among three different shading modes. The first shading mode is an ABSOLUTE shading mode in which a fixed density scale 110, shown in FIG. 6, indicates the relationship between interval pair frequency and the display density. In the ABSOLUTE shading mode, the density scale 110 of FIG. 6, does not vary. The second shading mode is a NORMALIZED shading mode in which the system 10 scales the density of the display to correspond to the minimum and maximum frequency of occurrence of the interval pairs. For example, if no interval pair occurred with a frequency greater than 100 times, more than one half of the dynamic range of the display is not used (i.e., values from 100 through 255). The system 10 will scale the intensity of the interval pairs so that the entire dynamic range of the display 38 is utilized. In the NORMALIZED shading mode, the density scale 110 varies as the range of occurrences varies. The third shading mode is a NO SHADING mode, which displays each interval pair at the maximum intensity, as is done in the prior art. This shading mode may be useful when there are relatively few interval pairs shown on the display 38.

In an alternative embodiment the display 38 is a multi-color monitor. As with the gray-scale monitor, the color display 38 has a plurality of data bits corresponding to each pixel. The value of the data bits are indicative of the color with which a pixel is lighted. For example, the color display 38 may have eight data bits corresponding to each pixel to provide 256 possible colors. Other numbers of data bits will provide a different number of colors. The different colors can be used to provide an indication of the frequency with which interval pairs occur. For example, interval pairs that occur infrequently can be display with cool colors, such as blue, while interval pairs occurring with greater frequency can be displayed with warm colors, such as red.

Figure 7:
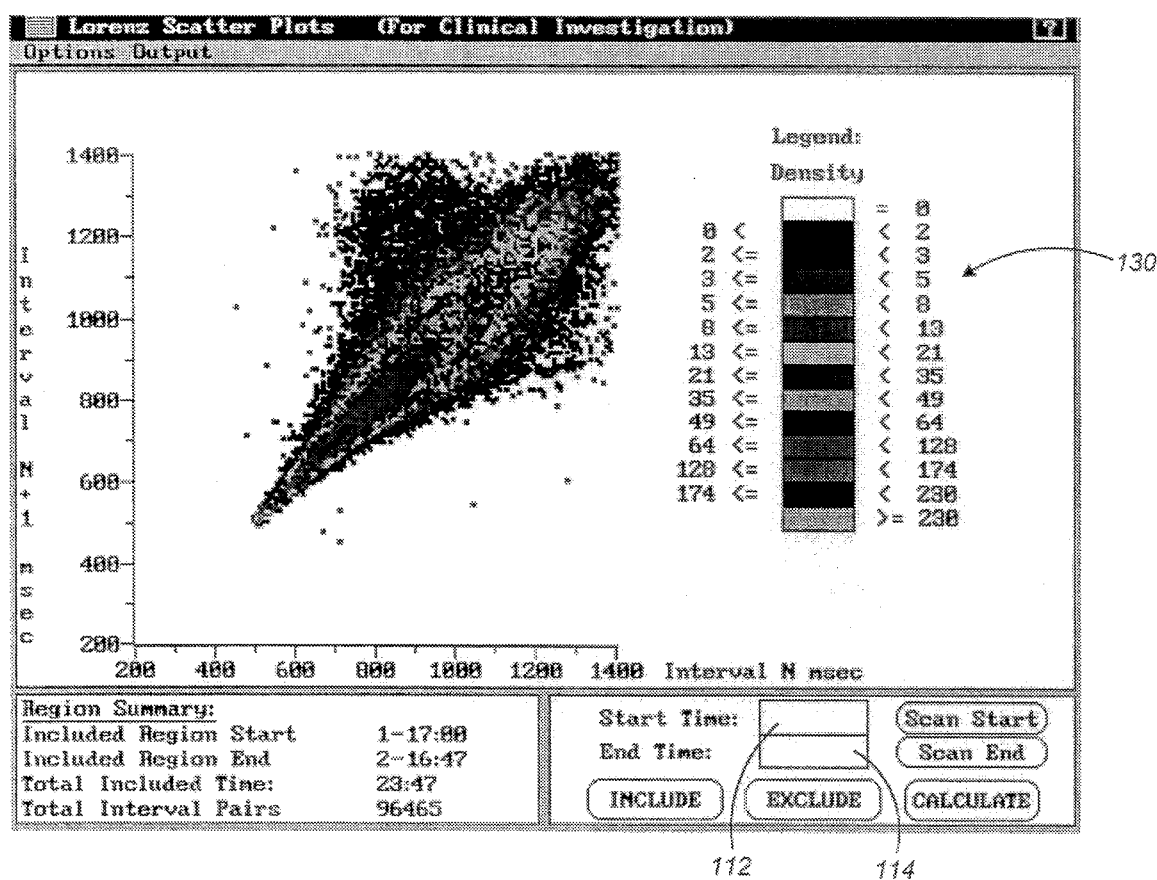
FIG. 7 is a color scatter-plot display generated by the system of FIG. 2.

FIG. 7 illustrates scatter-plot data displayed on the color display 38. As with the gray-scale display, the color display 38 has a density scale 130 to provide a quantitative measure of frequency of occurrence. In FIG. 7 the scatter-plot data is for the entire data collection period, as indicated by the lack of time entries in the start time display 112 and stop time display 114. The user can include or exclude any desired time period in the same manner as described with the gray-scale display. If the printer 40 (see FIG. 2) is a color printer, the printed scatter-plot will contain the color data. If the printer 40 is black and white printer, the printed scatter-plot will resemble FIG. 7.

The display 38, whether it is a gray-scale monitor or a color monitor, can also be used to dynamically display the scatter-plot data. The system 10 can display the scatter-plot data for the entire data collection period in a scanning mode where the scatter-plot data fades from the display 38 as it gets old and new scatter-plot data has a greater intensity, or a brighter color. For example, the data collection period may be 24 hours. The user may review the entire 24 hour data collection period in a short period of time, such as 10 minutes, by scanning the entire data collection period at a high speed. The system 10 displays the interval pairs on the scatter-plot in the same order as they occurred during the data collection period and uses the intensity or color to indicate the relative age of the particular interval pair with respect to other interval pairs. Thus, the older interval pairs change intensity or color as new interval pairs are displayed. Interval pairs eventually fade away on the display 38 as they become older. The user can see the interval pairs appear and fade as they age. This feature provides the user with the ability to review vast amounts of data in a short period of time and to select specific time periods that may require more careful review. For example, the user can review the entire 24 hour data collection period in 10 minutes, as described above. Based on the 10 minute review, the user may determine that a particular series of interval pairs occurred within a certain period of time, such as when the patient first awakens. The user can then review the period of time in which the patient is waking up by selecting the start and stop times, as previously discussed. Alternatively, the system 10 can cause the interval pairs to simply disappear after a certain period of time rather than have the data slowly fade, as described above. For example, the interval pairs can be displayed for 5 seconds and then disappear. The system 10 can process electrocardiograph data in real-time. In real-time situations, the fading display or the disappearing display described above both provide a simple way of eliminating old interval pairs as new interval pairs are plotted in the scatter-plot.

The system 10 has numerous features described above that permit great flexibility in collecting and analyzing data.

The various portions of the system, such as the analysis parameters, the display parameters, and the display 38 each provide advantages over the prior art. However, the combination of these features provides even greater advantages by allowing the user to select specific parameters and display the qualified interval pairs on the display 38, which can provide more detailed information than was possible in the prior art. For example, the user may wish to evaluate the operation of a demand pacemaker, which only generates pacer signals if the patient's heartbeat is outside a predetermined range. A typical demand pacemaker may only generate signals if the patient's heartbeat falls below a predetermined rate or fails to generate a heartbeat within a predetermined period of time.

Figure 8A:
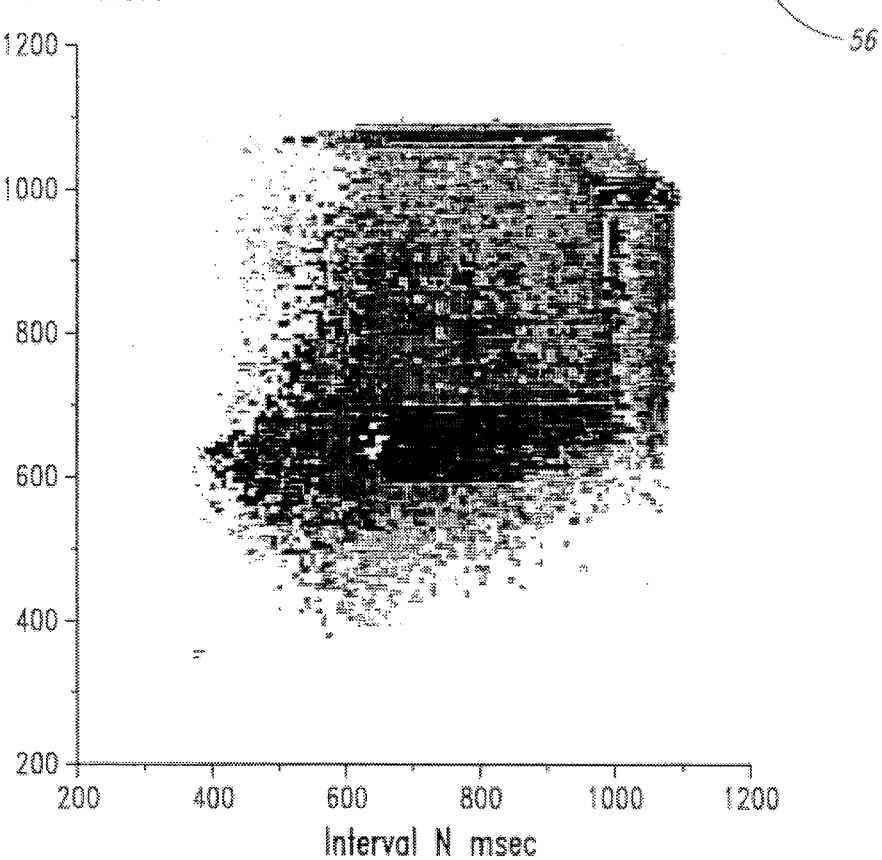
Figure 8C:
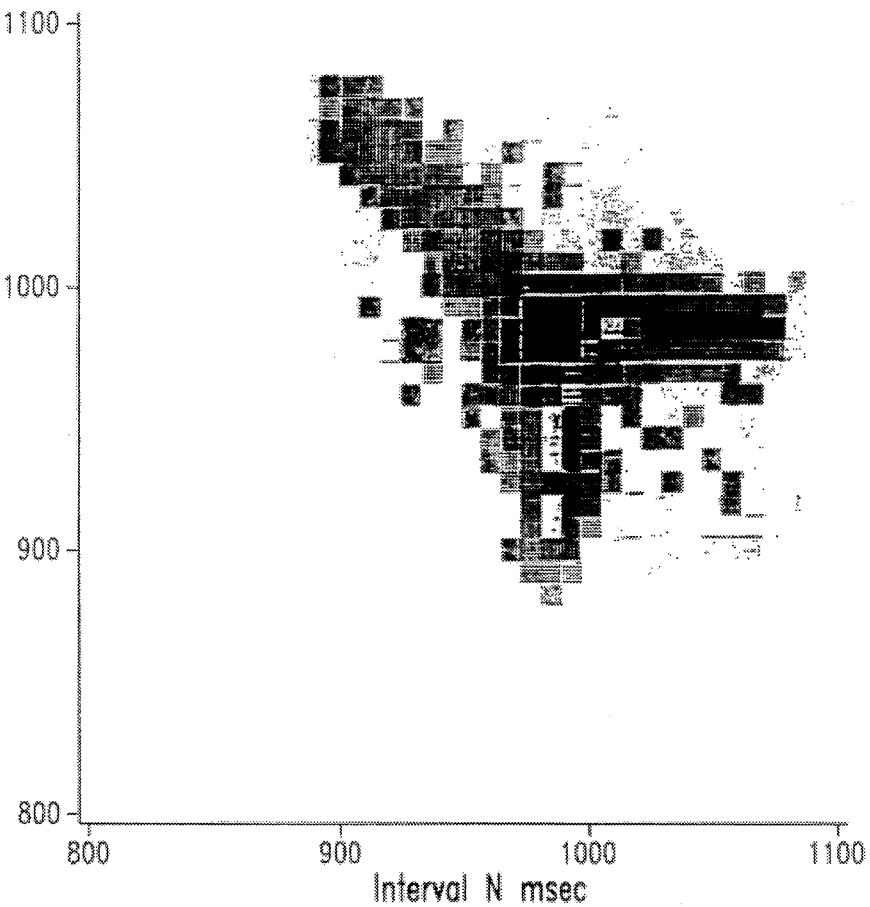
Figure 8D:
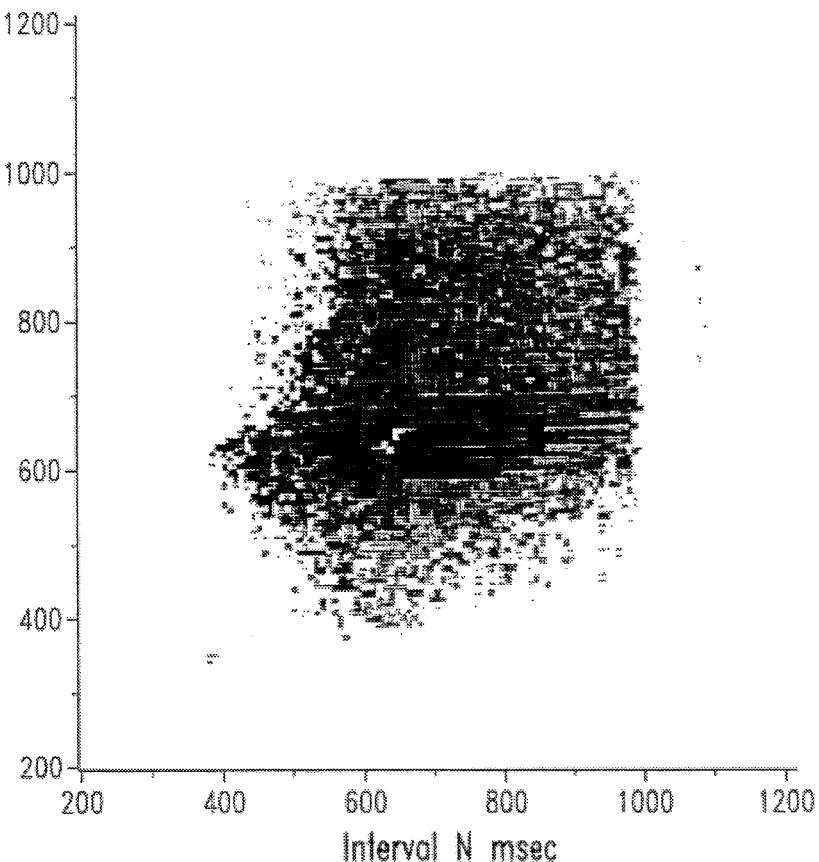

FIGS. 8A through 8D illustrate data collected from a patient with a demand pacemaker. The scatter-plots of FIGS. 8A through 8D are displayed on the color display 38 (see FIG. 2). As seen in the configuration menu 56, the scatter-plot of FIG. 8A includes all heartbeats collected over a 24 hour period, including intrinsic heartbeats from any source and extrinsic heartbeats. As can be seen from the scatter-plot of FIG. 8A, there is a great deal of variability in the heart rate intervals. This is in contrast to the scatter-plot of a normal heart shown in FIG. 6. The user can also gauge the performance of the pacemaker using the data of FIG. 8A. The rectangular border on the upper and right portions of the scatter-plot indicates that the pacemaker intervenes to generate a paced heartbeat any time the interval exceeds approximately 1050 milliseconds For a more detailed analysis of pacemaker operation, the user can examine pacer generated heartbeats by selecting Paced-Paced intervals for the analysis parameters for both interval 1 and interval 2. The resulting scatter-plot is shown in FIG. 8B where the configuration menu 56 indicates the selection of Paced-Paced heartbeats for both intervals. Note the great regularity of the scatter-plot data for the pacer generated heartbeats. The user can analyze the performance of the pacer by selecting the appropriate analysis parameters available with the system 10. The scatter-plot of FIG. 8B can be magnified by changing the time scales on the axes of the scatter-plot. FIG. 8C illustrates this magnification capability by magnifying the scatter-plot of FIG. 8B. The user can also analyze intrinsic beats by selecting the appropriate analysis parameters, as shown in FIG. 8D. The configuration menu 56 in FIG. 8D indicates that all intrinsic heartbeat sources have been selected. As discussed above, the rectangular border indicates that no intrinsic heartbeats with intervals exceeding approximately 1050 milliseconds are present because of the intervention of the pacemaker. Thus, the user can examine the scatter-plot data in a variety an manners that provide only the desired data. The system 10 can also display different interval pairs with different colors, as described above. For example, the system 10 can display pacer generated heartbeats in one color and intrinsic heartbeats in a second color. This allows the user to efficiently analyze large amounts of data and to selectively display data that meets the user specified parameters.

Figure 9B:
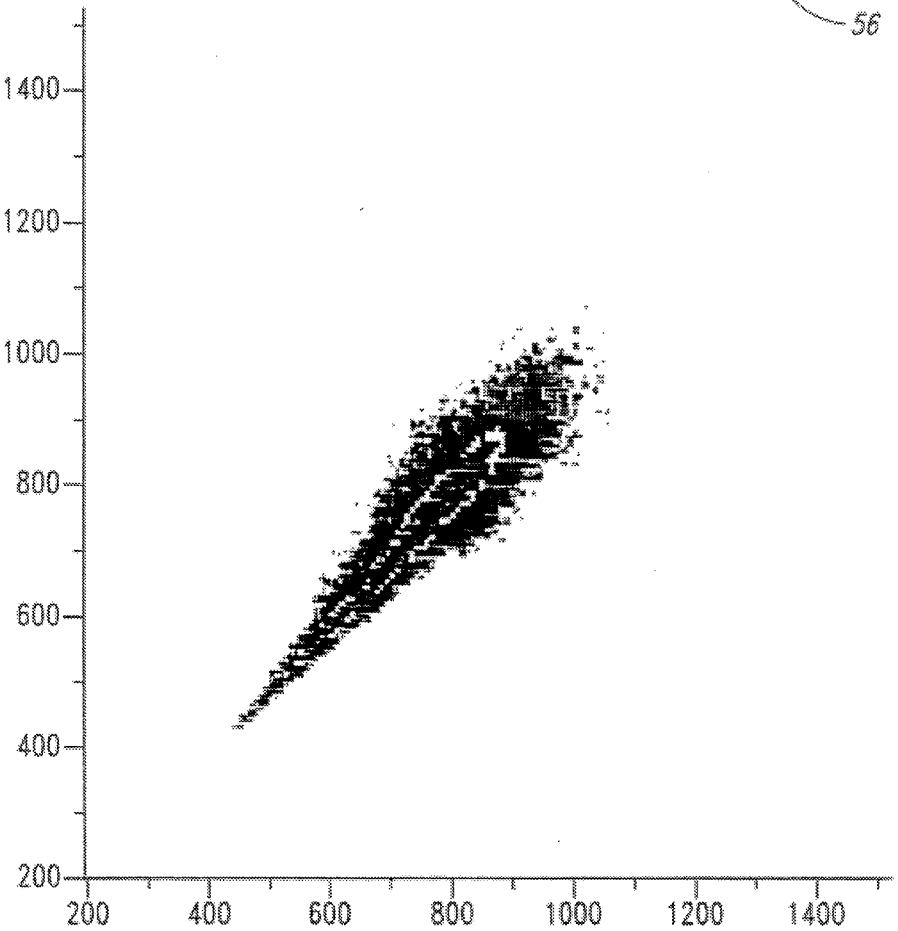

As another example of the usefulness of the system 10 in analyzing scatter-plot data, consider FIGS. 9A through 9H, which were generated by the system 10 from a 24 hour recording of a patient who has been diagnosed as having frequent isolated ventricular heartbeats and some isolated ventricular couplets, which are ventricular heartbeats that occur between two supraventricular heartbeats. The user can construct a variety of scatter-plots using the analysis parameters previously discussed. FIG. 9A is a scatter-plot of all heartbeats recorded over the 24 hour period. The color display 38 indicates the frequency of occurrence using different colors, as previously indicated. The user can vary the analysis and/or display parameters, and the system 10 will construct new scatter-plots that match the specified criteria. The majority of heartbeats occur along the diagonal, as is the case in normal cardiac intervals. However, the presence of side lobes in FIG. 9A indicates to the physician that isolated ventricular beats are occurring. This is indicated by the occurrence of interval pairs with a short first interval and a long second interval.

FIG. 9B is a scatter-plot constructed using only heartbeats that occurred as a result of Supraventricular-Supraventricular heartbeats for both interval 1 and interval 2, as indicated by the configuration menu 56. FIG. 9C is a scatter-plot constructed using only isolated ventricular heartbeats. The isolated ventricular heartbeats are ventricular heartbeats that occur between two supraventricular heartbeats. As seen in the configuration menu 56 of FIG. 9C, the analysis parameters have been selected to include only Supraventricular-Ventricular heartbeats for interval 1 and Ventricular-Supraventricular heartbeats for interval 2. Note that the isolated ventricular beat typically occurs within 400–500 milliseconds of the first supraventricular heartbeat, while the third heartbeat (another supraventricular heartbeat) occurs over a widely varying period of time due to what is clinically termed as a compensatory pause. The clinical importance of being able to isolate such events can be readily appreciated by those skilled in the art.

Figure 9D:
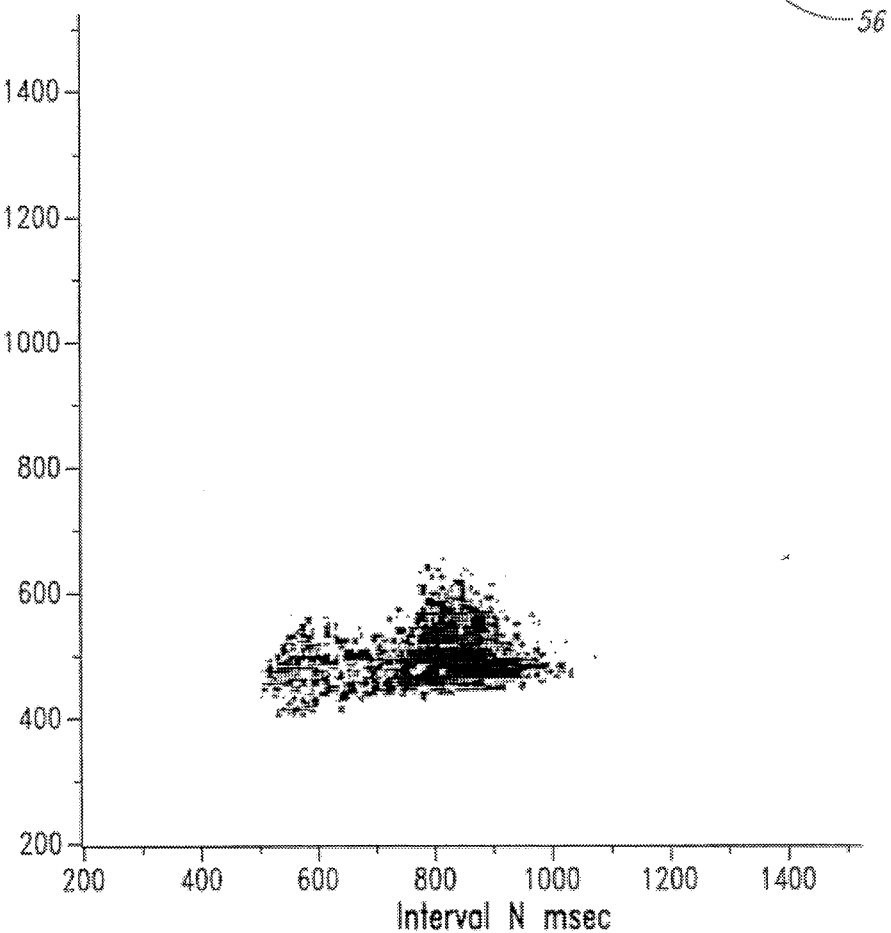

FIG. 9D is a scatter-plot constructed using only interval pairs that consist of two supraventricular heartbeats followed by a ventricular heartbeat. As seen in the configuration menu 56 of FIG. 9D, the analysis parameters have been selected to include only Supraventricular-Supraventricular heartbeats for interval 1 and Supraventricular-Ventricular heartbeats for interval 2. As seen in FIG. 9d, there is little variation in the interval between the two supraventricular heartbeats, but a widely varying period of time between the second supraventricular and the ventricular heartbeat.

FIG. 9E is a scatter-plot-constructed using only interval pairs that consist of a ventricular heartbeat followed by two supraventricular heartbeats. As seen in the configuration menu 56 of FIG. 9E, the analysis parameters have been selected to include only Ventricular-Supraventricular heartbeats for interval 1 and Supraventricular-Supraventricular heartbeats for interval 2.

FIG. 9F is a scatter-plot constructed using only interval pairs that consist of two ventricular heartbeats followed by supraventricular heartbeats. As seen in the configuration menu 56 of FIG. 9F, the analysis parameters have been selected to include only Ventricular-Ventricular heartbeats for interval 1 and Ventricular-Supraventricular heartbeats for interval 2.

Figure 9G:
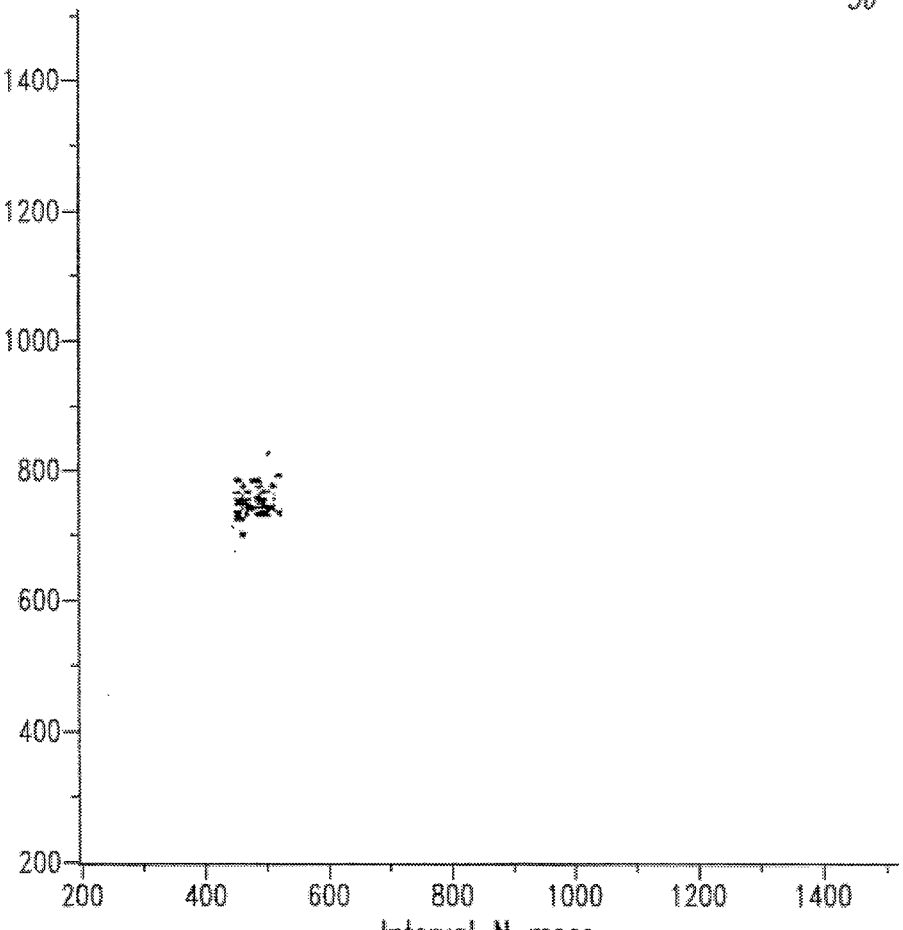

FIG. 9G is a scatter-plot constructed using only interval pairs that consist of a supraventricular heartbeat followed by two ventricular heartbeats. As seen in the configuration menu 56 of FIG. 9G, the analysis parameters have been selected to include only Supraventricular-Ventricular heartbeats for interval 1 and Ventricular-Ventricular heartbeats for interval 2.

FIG. 9H is a scatter-plot constructed using only isolated supraventricular heartbeats. Isolated supraventricular heartbeats are supraventricular heartbeats that occur between two ventricular heartbeats. As seen in the configuration menu 56 of FIG. 9G, the analysis parameters have been selected to include only Ventricular-Supraventricular heartbeats for interval 1 and Supraventricular-Ventricular heartbeats for interval 2.

Certain clinical abnormalities are less readily apparent to the user when analyzing the raw ECG data. However, the system 10 (see FIG. 2) is capable of detecting a variety of clinical abnormalities and alerting the user to the presence of a clinical abnormality. These clinical abnormalities are often related to subtle rhythm abnormalities. For example, the ECG data shown in FIG. 10A was collected from a patient over approximately a three minute period. The patient has a rhythm abnormality diagnosed as a Wenckebach 2nd degree AV block, which is characterized by a gradual and continuous shortening of the R—R interval until the shortened intervals are followed by a long R—R interval. While the ECG data of FIG. 10A reveals such characteristics, the rhythmic changes are not readily apparent.

Figure 10A:
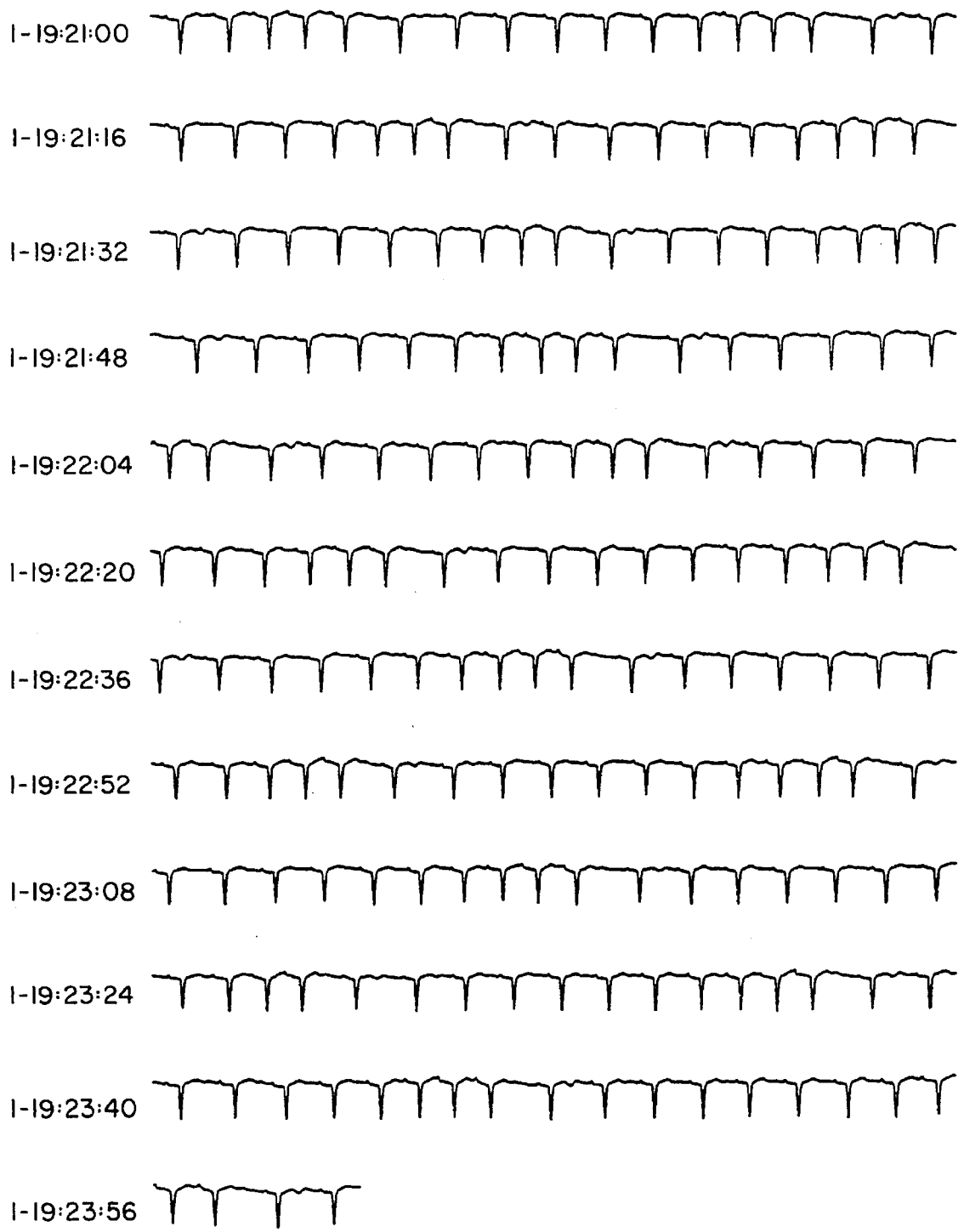
FIG. 10A is a sample ECG waveform collected from a patient with a clinical abnormality.
Figure 10B:
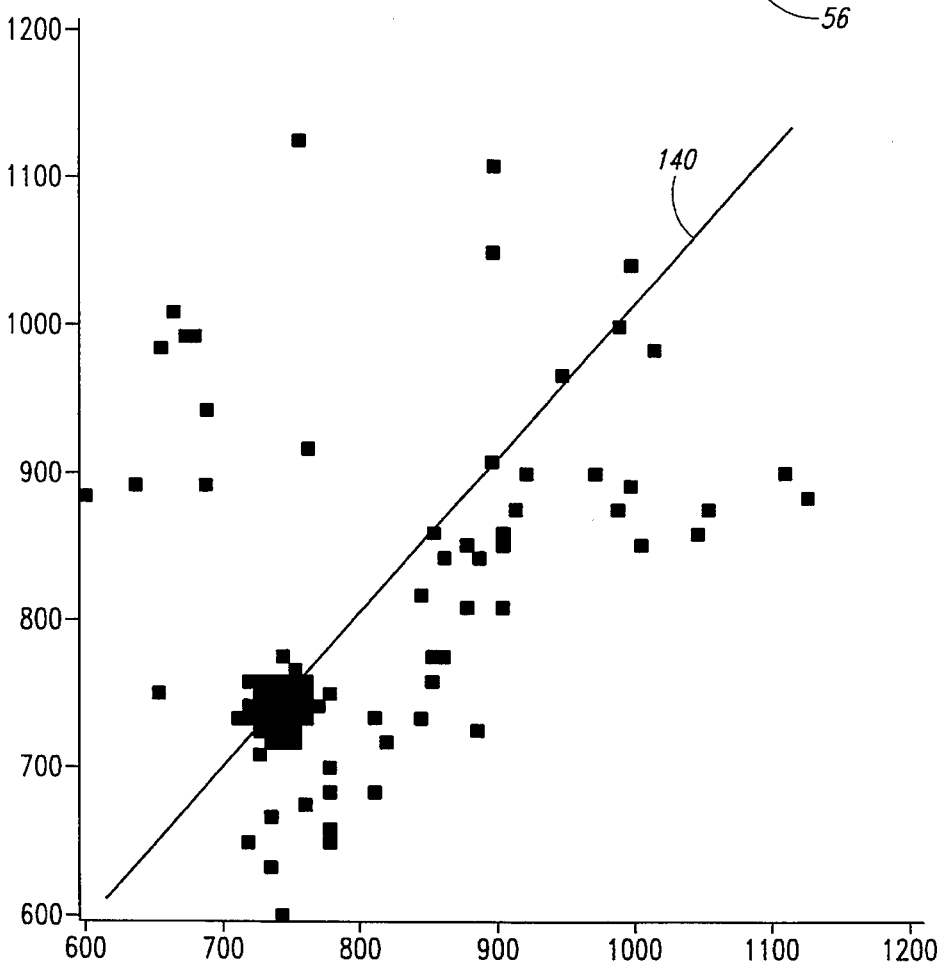
FIG. 10B is a scatter-plot generated by the system of FIG. 2 corresponding to the ECG wave/form of FIG. 10A.

While the raw ECG data of FIG. 10A may have subtle abnormalities, the scatter-plot data shown in FIG. 10B have distinctive features that are characteristic of a Wenckebach 2nd degree AV block. The scatter-plot of FIG. 10B is constructed from the same three minute interval as the raw ECG data of FIG. 10A using all interval pairs. As seen in the configuration menu 56, all beat sources have been selected for both the first and second intervals. Normal scatter-plot data is centered about a diagonal axis 140. However, the data in the scatter-plot of FIG. 10B has a predominance of interval pairs below the diagonal axis 140. These intervals are associated with a gradual and continuous shortening of the R—R interval. The subsequent longer intervals cluster far away from the diagonal axis 140.

Figure 10C:
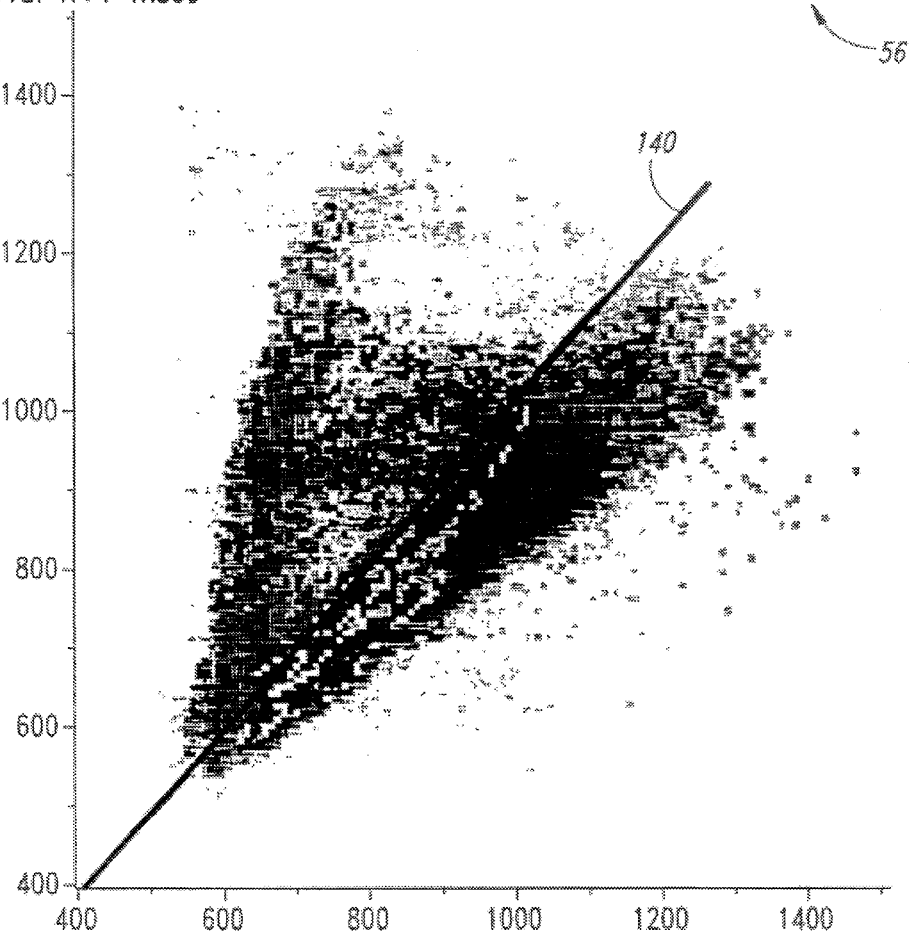
FIG. 10C is a scatter-plot generated by the system of FIG. 2 from ECG data collected from the patient with the clinical abnormality shown in FIG. 10A.

This effect is more evident when a scatter plot is constructed from data collected for a longer period of time. FIG. 10C is a scatter-plot constructed from data collected from a 24 hour period from the same patient whose data is shown in FIGS. 10A and 10B. As seen in the configuration menu 56, all beat sources have been selected for both the first and second intervals. The clustering of data below the diagonal axis 140 and the long intervals above the diagonal axis are symptomatic of a Wenckebach 2nd degree AV block.

The above example illustrates the detection of a Wenckebach 2nd degree AV block. However, the system 10 can identify a variety of rhythmic features and alert the user to the presence of the any abnormal rhythmic feature. The system 10 can identify a normal sinus rhythm, a normal sinus rhythm with ectopic beats, atrial flutter, atrial fibrillation, heart block, wandering atrial pacemaker, and the like. The system can also detect pacemaker abnormalities such as failure to sense, failure to capture, oversensing, and the like. Those skilled in the art will appreciate that a number of other abnormalities can be detected by the system 10.

The system 10 stores a variety of templates corresponding to various rhythmic conditions and compares these templates to a newly constructed scatter-plot. The system 10 alerts the user when a scatter-plot corresponds to one of the templates. The user can perform a side by side comparison of the scatter-plot data with the corresponding template. The user can also review the raw ECG data, in a manner previously described, to verify the presence or absence of the detected rhythmic condition. Thus, the system 10 provides a powerful analysis system that can detect a variety of clinical rhythmic conditions.

As can be seen frown the variety of scatter-plots shown in the examples above, the user can specify different combinations of analysis parameters to construct a scatter-plot that contains only the specified parameters. In addition, to the analysis parameters, the user can also take advantage of the display parameters available on the system 10. The time thresholds and ability to examine scatter-plot data based on the time of occurrence make it possible for the user to quickly focus in on the particular data of interest. The gray-scale display 38 (see FIG. 2) of color display 38 provide far greater detail than previously available in scatter-plots. Furthermore, the availability of fading scatter-plot displays, and time segments of scatter-plots provide a far more efficient technique for reducing vast amounts of data to a simple format that can be interpreted in a glance.

The system 10 can also perform analysis on the scatter-plot data to compare the scatter-plot data to previously recorded scatter-plot data. For example, the system 10 can store a scatter-plot collected by averaging a series of scatter-plots collected from a plurality of subjects with normal heartbeats to create a scatter-plot designated as "normal." The normal scatter-plot can then be compared with a scatter-plot collected from a particular individual. The system 10 can calculate differences between the individual scatter-plot and the normal scatter-plot. One such difference is the difference in the area encompassed by the scatter-plot. For example, the system can calculate the area of the scatter-plot that encompasses a predetermined percentage of the interval pairs, such as 90%. The system 10 then calculates the area in the individual scatter-plot required to encompass 90% of the interval pairs and calculates the difference in areas. Another example of the difference between the individual scatter-plot and the normal scatter-plot is the difference in the aspect ratio. Aspect ratio is defined as the size of the scatter-plot in a first dimension versus the size of the scatter-plot in a second, orthogonal, dimension. The system 10 calculates the length versus width of the individual scatter-plot and the length versus width of the normal scatter-plot and calculates the difference in aspect ratios. In addition to comparing the individual scatter-plot to a normal scatter-plot, the system can compare an individual scatter-plot collected at one period of time with a scatter-plot collected at a subsequent period of time. In this manner, the user can follow the progressive changes in the scatter-plot for the individual.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the display of cardiac data, the system comprising:

an interval monitor to calculate first and second cardiac intervals from electrocardiograph data, said first interval corresponding to a period of time between first and second heartbeats, said second interval corresponding to a period of time between said second heartbeat and a third heartbeat;

a source analyzer to receive said eletrocardiograph data and determine therefrom a beat source for each of said heartbeats; and a display having first and second axes each labeled with a plurality of indicators corresponding to time intervals for displaying said first and second intervals as a coordinate pair only if said source analyzer determines that said beat sources for said first, second, and third heartbeats match a set of selected heartbeat sources for said first, second, and third heartbeats, said first interval being displayed as a first coordinate in said coordinate pair using said plurality of indicators along said first axis, and said second interval being displayed as a second coordinate in said coordinate pair using said plurality of indicators along said second axis.

2. The system of claim 1, further including a cardiac monitor electrically coupled to a patient to detect electromagnetic signals indicative of the patient's heartbeat, said cardiac monitor generating said electrocardiograph data for said interval monitor and said source analyzer.

3. The system of claim 1, further including a data file to store said electrocardiograph data.

4. The system of claim 3 wherein said data file is a tape storing said electrocardiograph data.

5. The system of claim 3 wherein said data file is a data event recorder storing said electrocardiograph data.

6. The system of claim 1 wherein said first, second, and third heartbeats are successive heartbeats, said interval monitor calculating said first and second intervals for said successive heartbeats and said source analyzer determines said beat source for said successive heartbeats.

7. The system of claim 1 wherein said first and second axes are orthogonal with respect to each other.

8. The system of claim 1, further including selection means for selecting said set of heartbeat sources for said first, second and third heartbeats.

9. The system of claim 8 wherein said source analyzer determines said beat source from a set of heartbeat source comprising at least one of a normal heartbeat, ventricular heartbeat, pacer heartbeat, and an intrinsic heartbeat.

10. The system of claim 1, further including a heartbeat analyzer to receive said electrocardiograph data and determine therefrom a clinical type for each of said heartbeats, said display displaying said first and second intervals only for said first, second and third heartbeats whose clinical type matches a selected clinical type for said first, second and third heartbeats.

11. The system of claim 10, further including selection means for selecting said clinical type for said first, second and third heartbeats.

12. The system of claim 10 wherein said heartbeat analyzer determines said clinical type from a set of clinical types comprising at least one of a premature atrial complex clinical type and a pause clinical type.

13. The system of claim 1 wherein said display has a plurality of intensity data bits to represent an intensity value for said coordinate pair, said intensity value having an initial value such that said coordinate pair is not visible on said display, said display increasing said intensity value each time that said first and second intervals correspond to said coordinate pair, whereby said coordinate pair has a higher intensity value each time that said first and second intervals correspond to said coordinate pair.

14. The system of claim 13 wherein said display increases said intensity value by incrementing said intensity data bits.

15. The system of claim 13, further including timer means for measuring a predetermined period of time, said display decreasing said intensity value for said coordinate pair if said first and second intervals do not correspond to said coordinate pair within said predetermined period of time, whereby said coordinate pair has a lower intensity value each time that said first and second intervals do not correspond to said coordinate pair within said predetermined period of time.

16. The system of claim 13, further including timer means for measuring a predetermined period of time, said display setting said intensity value to said initial intensity value for said coordinate pair if said first and second intervals do not correspond to said coordinate pair within said predetermined period of time.

17. The system of claim 1 wherein said display is a color display, said color display having a plurality of color data bits representing a color value corresponding to a plurality of colors for said coordinate pair, said color data bits having an initial color value such that said coordinate pair is not visible on said display, said display altering said color data bits in a first manner each time that said first and second intervals correspond to said coordinate pair.

18. The system of claim 17, further including timer means for measuring a predetermined period of time, said display altering said color data bits in a second manner for said coordinate pair if said first and second intervals do not correspond to said coordinate pair within said predetermined period of time.

19. The system of claim 18 wherein said second manner of altering said color data bits is opposite said first manner of altering said color data bits, whereby the color data bits corresponding to said coordinate pair changes back to a previous color if said first and second intervals do not correspond to said coordinate pair within said predetermined period of time.

20. The system of claim 17, further including timer means for measuring a predetermined period of time, said display setting said color data bits to said initial color value for said coordinate pair if said first and second intervals do not correspond to said coordinate pair within said predetermined period of time.

21. The system of any of the preceding claims 15, 16, 18, or 20, further including user selectable means for altering said predetermined period of time.

22. The system of claim 1, further including timer means for measuring a first period of time, said display displaying said coordinate pair when said first and second intervals occur during said first period of time.

23. The system of claim 22, further including storage means for storing said coordinate pair being displayed during said first period of time.

24. The system of claim 23, further including user selectable means for selecting a second period of time less than said first period of time, said display displaying said stored coordinate pair for said first and second intervals occur during said second period of time, whereby the user can review said stored coordinate pair for any portion of said first period of time in increments of said second period of time.

25. The system of claim 23 wherein said display displays said coordinate pair for a second period of time for which said first, second, and third heartbeats fit user selectable criteria.

26. The system of claim 25 wherein said user selectable criteria comprises at least one of a heart rate criterion, a beat source criterion, and a clinical type criterion.

27. The system of claim 25 wherein said display is a color display, said color display having a plurality of color data bits representing a color value corresponding to a plurality of colors for said coordinate pair, said color display displaying said coordinate pair in a first color for a first user selectable criteria and said coordinate pair in a second color for a second user selectable criteria.

28. The system of claim 1 wherein said display is a color display, said color display having a plurality of color data bits representing a color value corresponding to a plurality of colors for said coordinate pair, said color data bits having an initial color value such that said coordinate pair is not visible on said display, said display altering said color data bits to generate a first color different from said initial color value when said first and second intervals correspond to said coordinate pair.

29. The system of claim 28, further including timer means for measuring a first predetermined period of time, said color display generating said first color for said coordinate pair when said first and second intervals occur during said first predetermined period of time.

30. The system of claim 29 wherein said timer means measures a second predetermined period of time, said color display generating a second color different from said initial and first colors for said coordinate pair when said first and second intervals occur during said second predetermined period of time.

31. The system of claim 30 wherein said first and second predetermined periods of time correspond to different times of day.

32. The system of claim 1 wherein said interval monitor comprises a means for calculating said first and second intervals only for said first, second, and third heartbeats whose beat sources are determined by said source analyzer to match said set of selected heartbeat sources.

33. A system for the display of cardiac data, the system comprising:

an interval monitor to calculate first and second cardiac intervals from electrocardiograph data, said first interval corresponding to a period of time between first and second heartbeats, said second interval corresponding to a period of time between said second heartbeat and a third heartbeat;

timer means, coupled to said interval monitor and receiving data corresponding to said first and second cardiac intervals, for determining if said first and second intervals meet a predetermined threshold time criterion; and a display having first and second axes each labeled with a plurality of indicators corresponding to time intervals for displaying said first and second intervals as a coordinate pair only if said timer means determines that said first and second intervals meet said predetermined threshold time criterion, said first interval being displayed as a first coordinate in said coordinate pair using said plurality of indicators along said first axis, and said second interval being displayed as a second coordinate in said coordinate pair using said plurality of indicators along said second axis.

34. The system of claim 33, further including user selectable means for altering said predetermined threshold time criterion.

35. The system of claim 33 wherein said predetermined threshold time criterion is a minimum threshold time, said display displaying said coordinate pair only if said timer means determines that said first and second intervals are greater than said minimum threshold time.

36. The system of claim 33 wherein said predetermined threshold time criterion is a maximum threshold time, said display displaying said coordinate pair only if said timer means determines that said first and second intervals are less than said maximum threshold time.

37. The system of claim 33 wherein said first, second, and third heartbeats are successive heartbeats said interval monitor calculating said first and second intervals for said successive heartbeats.

38. The system of claim 33, further including a source analyzer to receive said electrocardiograph data and determine therefrom a beat source for each of said heartbeats, said display displaying only said coordinate pairs whose beat sources match a set of selected heartbeat sources for said first, second and third heartbeats.

39. The system of claim 38, further including selection means for selecting said set of heartbeat sources for said first, second and third heartbeats.

40. The system of claim 38 wherein said source analyzer determines said beat source from a set of heartbeat sources comprising at least one of a normal heartbeat, ventricular heartbeat, pacer heartbeat, and an intrinsic heartbeat.

41. The system of claim 33, further including a heartbeat analyzer to receive said electrocardiograph data and determine therefrom a clinical type for each of said heartbeats, said display displaying said coordinate pairs only for said first, second and third heartbeats whose clinical type matches a selected clinical type for said first, second and third heartbeats.

42. The system of claim 41, further including selection means for selecting said clinical type for said first, second and third heartbeats.

43. The system of claim 41 wherein said heartbeat analyzer determines said clinical type from a set of clinical types comprising at least one of a premature atrial complex clinical type and a pause clinical type.

44. A system for the display of cardiac data, the system comprising:

storage means for storing electrocardiograph data collected from a patient over a predetermined period of time;

an interval monitor to calculate first and second cardiac intervals for said predetermined period of time from said electrocardiograph data, said first interval corresponding to a period of time between first and second heartbeats, said second interval corresponding to a period of time between said second heartbeat and a third heartbeat;

a display coupled to said interval monitor to receive said first and second intervals therefrom, said display having first and second axes each labeled with a plurality of indicators corresponding to time intervals for displaying said first and second intervals as a plurality of coordinate pairs, each of said first intervals being displayed as a first coordinate in said coordinate pair using said plurality of indicators along said first axis, and each of said second intervals being displayed as a second coordinate in said coordinate pair using said plurality of indicators along said second axis;

selection means for selecting a particular one of said plurality of coordinate pairs on said display; and display means for displaying said electrocardiograph data associated with said selected coordinate pair.

45. The system of claim 44 wherein said first and second intervals correspond to said selected coordinate pair a plurality of occurrences during said predetermined period of time, the system further including occurrence selection means for selecting a particular one of said plurality of occurrences, said display displaying said electrocardiograph data associated with said selected occurrence.

46. The system of claim 44 wherein said occurrence selection means includes a scroll bar to permit the user to scroll through said plurality of occurrences, said display displaying said electrocardiograph data associated with each of said scrolled occurrences.

47. The system of claim 44, further including edit means for editing said electrocardiograph data.

48. The system of claim 47, wherein said interval monitor recalculates said first and second intervals from said edited electrocardiograph data and said display displays said recalculated intervals.

49. A system for the display of cardiac data, the system comprising:

an interval monitor to calculate first and second cardiac intervals from electrocardiograph data containing a plurality of heartbeats, said first interval corresponding to a period of time between first and second heartbeats, said second interval corresponding to a period of time between said second heartbeat and a third heartbeat, said first and second intervals defining a plurality of interval pairs;

a source analyzer to receive said electrocardiograph data and determine therefrom a beat source for each of said heartbeats, each of said plurality of interval pairs corresponding to said first, second and third heartbeats whose beat sources match a set of selected heartbeat sources for said first, second and third heartbeats being defined as a qualified interval pair; and a display coupled to said interval monitor and said source analyzer to display said qualified interval pair, said display having first and second axes and displaying said first interval of said qualified interval pair as a first coordinate in a coordinate pair using said first axis, and said second interval as a second coordinate in said coordinate pair using said second axis.

50. The system of claim 49, further including a heartbeat analyzer to determine a clinical type for each of said heartbeats, each of said plurality of interval pairs corresponding to said first, second and third heartbeats whose clinical type matches a selected clinical type for said first, second and third heartbeats being defined as said qualified interval pair.

51. The system of claim 49 wherein said first, second, and third heartbeats are successive heartbeats, said interval monitor calculating said first and second intervals for said successive heartbeats and said source analyzer determines said beat source for said successive heartbeats.

52. The system of claim 49 wherein said interval monitor comprises a means for calculating said first and second intervals only for said first, second, and third heartbeats whose beat sources are determined by said source analyzer to match said set of selected heartbeat sources.

53. A method for the display of cardiac data on a display having first and second axes each labeled with a plurality of indicators corresponding to time intervals, the method comprising the steps of:

calculating first and second cardiac intervals from electrocardiograph data, said first interval corresponding to a period of time between first and second heartbeats, said second interval corresponding to a period of time between said second heartbeat and a third heartbeat;

determining a beat source for each of said heartbeats; and displaying said first and second intervals as a coordinate pair on the display only if said beat source for each of said heartbeats matches a set of selected beat sources for said first, second, and third heartbeats, said first interval being displayed as a first coordinate in said coordinate pair using the first axis, and said second interval being displayed as a second coordinate in said coordinate pair using the second axis.

54. The method of claim 53 wherein a cardiac monitor is electrically coupled to a patient to detect electromagnetic signals indicative of the patient's heartbeat and generate electrocardiograph data related thereto, said step of calculating said first and second intervals calculating said first and second intervals from said electrocardiograph data generated by said cardiac monitor.

55. The method of claim 53 wherein said first, second, and third heartbeats are successive heartbeats, said steps of calculating, determining, and displaying being performed on said successive heartbeats.

56. The method of claim 53, further including the step of selecting said set of heartbeat sources for said first, second and third heartbeats.

57. The method of claim 56 wherein said step of determining said beat sources determines said beat sources from a set of heartbeat sources comprising at least one of a normal heartbeat, ventricular heartbeat, pacer heartbeat, and an intrinsic heartbeat.

58. The method of claim 53, further including the step of determining a clinical type for each of said heartbeats, said step of displaying said first and second intervals only displaying said first and second intervals for said first, second and third heartbeats whose clinical type matches a selected clinical type for said first, second and third heartbeats.

59. The method of claim 58, further including the step of selecting said clinical type for said first, second and third heartbeats.

60. The method of claim 58 wherein said step of determining said clinical type determines said clinical type from a set of clinical types comprising at least one of a premature atrial complex clinical type and a pause clinical type.

61. The method of claim 53, further including the step of:

measuring a first period of time, said step of displaying said coordinate pair displaying said coordinate pair when said first and second intervals occur during said first period of time.

62. The method of claim 61, further including the step of storing said coordinate pair being displayed during said first period of time.

63. The method of claim 62 wherein said step of displaying said coordinate pair displays said coordinate pair when said first and second intervals occur during a second predetermined period of time for which said first, second, and third heartbeats fit user selectable criteria.

64. The method of claim 63 wherein said user selectable criteria comprises at least one of a heart rate criterion, a beat source criterion, and a clinical type criterion.

65. The method of claim 63 wherein the display is a color display having a plurality of color data bits representing a color value corresponding to a plurality of colors for said coordinate pair, said step of displaying said coordinate pair displaying said coordinate pair in a first color for a first user selectable criteria and said coordinate pair in a second color for a second user selectable criteria.

66. The method of claim 53 wherein said step of calculating said first and second intervals calculates said first and second intervals only for said first, second, and third heartbeats whose beat sources match said set of selected heartbeat sources.

67. A method for the display of cardiac data, the method comprising the steps of:

calculating first and second cardiac intervals from electrocardiograph data, said first interval corresponding to a period of time between first and second heartbeats, said second interval corresponding to a period of time between said second heartbeat and a third heartbeat;

measuring a predetermined threshold time criterion associated with said first and second intervals; and displaying said first and second intervals as a coordinate pair only if said first and second intervals meet said predetermined threshold time criterion, said first interval being displayed as a first coordinate in said coordinate pair using a first axis on the display, and said second interval being displayed as a second coordinate in said coordinate pair using a second axis on the display.

68. The method of claim 67, further including the step of altering said predetermined threshold time criterion.

69. The method of claim 67 wherein said predetermined threshold time criterion is a minimum threshold time, said first and second intervals being displayed only for first, second, and third heartbeats whose intervals are greater than said minimum threshold time.

70. The method of claim 67 wherein said predetermined threshold time criterion is a maximum threshold time, said first and second intervals being displayed only for first, second, and third heartbeats whose intervals are less than said maximum threshold time.

71. The method of claim 67 wherein said first, second, and third heartbeats are successive heartbeats, said steps of calculating, measuring and displaying being performed on said successive heartbeats.

72. The method of claim 67, further including the step of determining a beat source for each of said heartbeats, said step of displaying said first and second intervals displaying said first and second intervals only for said first, second and third heartbeats whose beat sources match a set of selected heartbeat sources for said first, second and third heartbeats.

73. The method of claim 72, further including the step of selecting said set of heartbeat sources for said first, second and third heartbeats.

74. The method of claim 72 wherein said step of determining said beat sources determines said beat sources from a set of heartbeat sources comprising at least one of a normal heartbeat, ventricular heartbeat, pacer heartbeat, and an intrinsic heartbeat.

75. The method of claim 67, further including the step of determining a clinical type for each of said heartbeats, said step of displaying said first and second intervals displaying said first and second intervals only for said first, second and third heartbeats whose clinical type matches a selected clinical type for said first, second and third heartbeats.

76. The method of claim 75, further including the step of selecting said clinical type for said first, second and third heartbeats.

77. The method of claim 75 wherein said step of determining said clinical type determines said clinical type from a set of clinical types comprising at least one of a premature atrial complex clinical type and a pause clinical type.

* * * * *

UNITED STATES PATENT AND TRADEMARK OFFICE
CERTIFICATE OF CORRECTION

PATENT NO.    :    5,622,178
DATED         :    April 22, 1997
INVENTOR(S)   :    Jeffrey J. Gilham It is certified that error appears in the above identified patent and that said Letters Patent is hereby corrected as shown below:

In column 17, claim 9, line 25, please delete the second instance of "source" and insert therefor --sources--.

In column 20, claim 46, line 53, please delete "44" and insert therefor --45--.

Signed and Sealed this

Seventeenth Day of February, 1998

Attest:

BRUCE LEHMAN

*Attesting Officer*     *Commissioner of Patents and Trademarks*